US009007387B2

(12) United States Patent
Sugama

(10) Patent No.: US 9,007,387 B2
(45) Date of Patent: Apr. 14, 2015

(54) DRAWING PROCESSING APPARATUS AND METHOD

(71) Applicant: Fujitsu Limited, Kawasaki (JP)

(72) Inventor: Yasushi Sugama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 13/865,315

(22) Filed: Apr. 18, 2013

(65) Prior Publication Data

US 2013/0314430 A1 Nov. 28, 2013

(30) Foreign Application Priority Data

May 22, 2012 (JP) .................................. 2012-116842

(51) Int. Cl.
| G06F 12/00 | (2006.01) |
| G06F 12/02 | (2006.01) |
| G06T 1/60 | (2006.01) |
| G06T 15/00 | (2011.01) |

(52) U.S. Cl.
CPC ................. *G06T 1/60* (2013.01); *G06T 15/005* (2013.01)

(58) Field of Classification Search
CPC ......................... G06T 1/60; G09G 5/39; G06F 12/02–12/0292; G06F 13/18; G06F 12/00
USPC .......... 345/530, 531, 535, 536, 543, 544, 564
See application file for complete search history.

(56) References Cited

U.S. PATENT DOCUMENTS

| 6,483,505 | B1 * | 11/2002 | Morein et al. ................. 345/419 |
| 6,819,321 | B1 | 11/2004 | Hsieh et al. |
| 7,233,335 | B2 * | 6/2007 | Moreton et al. ............... 345/522 |
| 8,212,832 | B2 * | 7/2012 | Stefanidis et al. ............. 345/543 |
| 2002/0039100 | A1 | 4/2002 | Morphet |
| 2003/0184555 | A1 | 10/2003 | Fraser |
| 2005/0221325 | A1 | 10/2005 | Thill |

FOREIGN PATENT DOCUMENTS

| JP | 2003-296747 | 10/2003 |
| JP | 2003-529859 | 10/2003 |
| JP | 2003-536153 | 12/2003 |
| JP | 2005-526517 | 9/2005 |

* cited by examiner

*Primary Examiner* — Jacinta M Crawford
(74) *Attorney, Agent, or Firm* — Fujitsu Patent Center

(57) ABSTRACT

A drawing processing apparatus is disclosed. A graphic index of a graphic included in a display screen or graphic description information which includes a setting parameter to be applied to the graphic is determined for each of regions dividing the display screen. A data size of the graphic description information is aggregated for the regions. A start address in a memory is determined to store the graphic description information into a successive storage area in the memory, based on the aggregated data size. The data size of an area of an overflow occurrence target is stored when the overflow occurs. The graphic description information of the regions is successively written from the start address when the overflow does not occur. A write process is stopped, and resumed from the area of the overflow occurrence target by using the data size when the overflow occurs.

5 Claims, 32 Drawing Sheets

FIG.2
SCENE DATA

| | |
|---|---|
| X1 | SETTING_A_0 |
| X2 | SETTING_B_0 |
| X3 | SETTING_C_0 |
| X4 | TRIANGLE_1 |
| X5 | TILE_0 |
| X6 | TILE_1 |
| X7 | TRIANGLE_2 |
| X8 | TILE_0 |
| X9 | TILE_1 |
| X10 | TILE_2 |
| X11 | SETTING_C_1 |
| X12 | TRIANGLE_3 |
| X13 | TILE_2 |
| X14 | SETTING_A_1 |
| X15 | TRIANGLE_4 |
| X16 | TILE_3 |
| X17 | END OF SCENE |

FIG.5

| TITLE NUMBER | AGGREGATION VALUE OF DATA SIZE | GRAPHIC NUMBER |
|---|---|---|
| 0 | $D_0$ | $NT_0$ |
| 1 | $D_1$ | $NT_1$ |
| 2 | $D_2$ | $NT_2$ |
| ⋮ | ⋮ | ⋮ |

FIG.6

| SETTING PARAMETER | VALUE OF SETTING PARAMETER | GRAPHIC NUMBER |
|---|---|---|
| SETTING_A | A_na | $NP_A$ |
| SETTING_B | B_nb | $NP_B$ |
| SETTING_C | C_nc | $NP_C$ |
| ⋮ | ⋮ | ⋮ |

FIG.12

GRAPHIC NUMBER RETAINING PART

| | |
|---|---|
| 0 | |

~123

~129

| TILE NUMBER | AGGREGATION VALUE OF DATA SIZES | GRAPHIC NUMBER |
|---|---|---|
| 0 | 0 | 0 |
| 1 | 0 | 0 |
| 2 | 0 | 0 |
| 3 | 0 | 0 |
| ... | | |

~125

| SETTING PARAMETER | VALUE OF SETTING PARAMETER | GRAPHIC NUMBER |
|---|---|---|
| SETTING_A | 0 | 0 |
| SETTING_B | 0 | 0 |
| SETTING_C | 0 | 0 |
| ... | | |

FIG.13

GRAPHIC NUMBER RETAINING PART

| | |
|---|---|
| 0 | ~123 |

~129

| TILE NUMBER | AGGREGATION VALUE OF DATA SIZES | GRAPHIC NUMBER |
|---|---|---|
| 0 | 0 | 0 |
| 1 | 0 | 0 |
| 2 | 0 | 0 |
| 3 | 0 | 0 |

...

~125

| SETTING PARAMETER | VALUE OF SETTING PARAMETER | GRAPHIC NUMBER |
|---|---|---|
| SETTING_A | VALUE OF SETTING_A_0 | 0 |
| SETTING_B | VALUE OF SETTING_B_0 | 0 |
| SETTING_C | VALUE OF SETTING_C_0 | 0 |

| TILE NUMBER | AGGREGATION VALUE OF DATA SIZES | GRAPHIC NUMBER |
|---|---|---|
| 0 | 0x28+0x8→0x30 | 1→2 |
| 1 | 0x28+0x8→0x30 | 1→2 |
| 2 | 0x0+0x28→0x28 | 0→2 |
| 3 | 0 | 0 |

129

GRAPHIC NUMBER RETAINING PART

1→2

123

| SETTING PARAMETER | VALUE OF SETTING PARAMETER | GRAPHIC NUMBER |
|---|---|---|
| SETTING_A | VALUE OF SETTING_A_0 | 0 |
| SETTING_B | VALUE OF SETTING_B_0 | 0 |
| SETTING_C | VALUE OF SETTING_C_0 | 0 |

GRAPHIC NUMBER RETAINING PART

| 1→2 |
|---|

~123

~129

| TILE NUMBER | AGGREGATION VALUE OF DATA SIZES | GRAPHIC NUMBER |
|---|---|---|
| 0 | 0x30 | 2 |
| 1 | 0x30 | 2 |
| 2 | 0x28+0x10→0x38 | 2→3 |
| 3 | 0 | 0 |
| ... | | |

~125

| SETTING PARAMETER | VALUE OF SETTING PARAMETER | GRAPHIC NUMBER |
|---|---|---|
| SETTING_A | VALUE OF SETTING_A_0 | 0 |
| SETTING_B | VALUE OF SETTING_B_0 | 0 |
| SETTING_C | VALUE OF SETTING_C_1 | 2 |
| ... | | |

FIG.17

GRAPHIC NUMBER RETAINING PART

| 4 |
|---|

~123

~129

| TILE NUMBER | AGGREGATION VALUE OF DATA SIZES | GRAPHIC NUMBER |
|---|---|---|
| 0 | 0x30 | 2 |
| 1 | 0x30 | 2 |
| 2 | 0x38 | 3 |
| 3 | 0x28 | 4 |
| ⋮ | | |

~125

| SETTING PARAMETER | VALUE OF SETTING PARAMETER | GRAPHIC NUMBER |
|---|---|---|
| SETTING_A | VALUE OF SETTING_A_1 | 3 |
| SETTING_B | VALUE OF SETTING_B_0 | 0 |
| SETTING_C | VALUE OF SETTING_C_1 | 2 |
| ⋮ | | |

FIG.19

| TILE NUMBER | AGGREGATION VALUE OF DATA SIZES | GRAPHIC NUMBER |
|---|---|---|
| 0 | 0x2000_0000 | 0 |
| 1 | 0x2000_0030 | 0 |
| 2 | 0x2000_0060 | 0 |
| 3 | 0x2000_0098 | 0 |

129

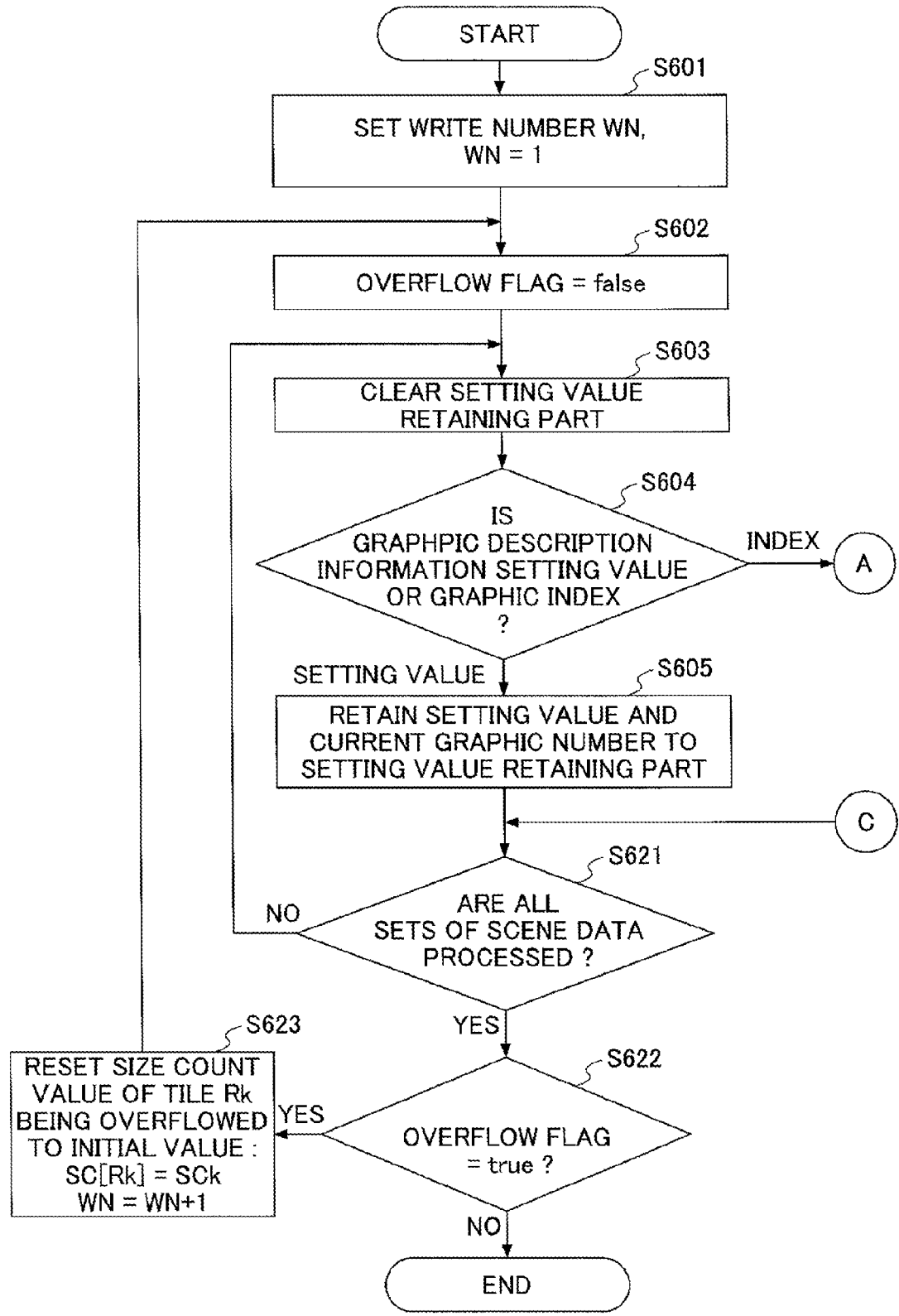

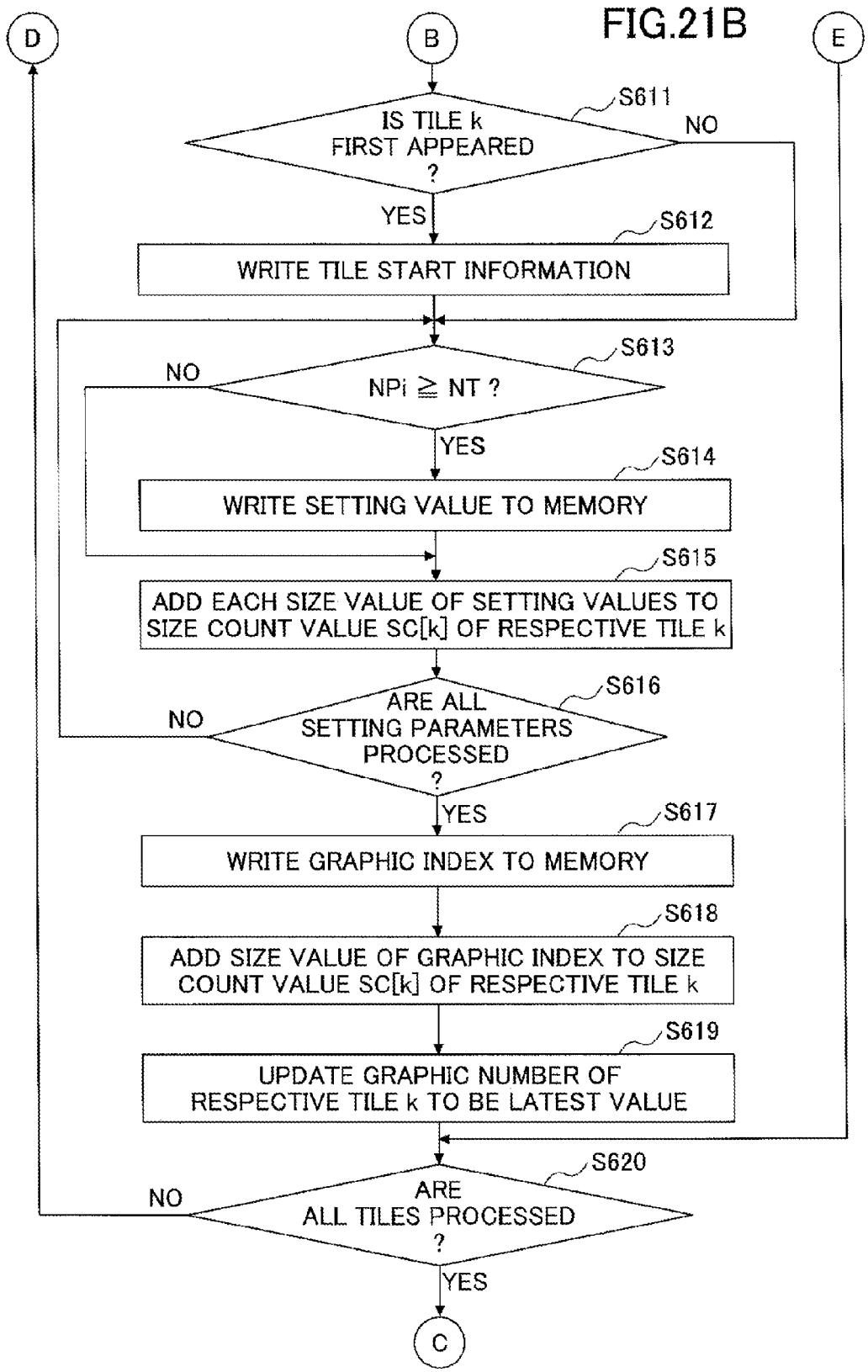

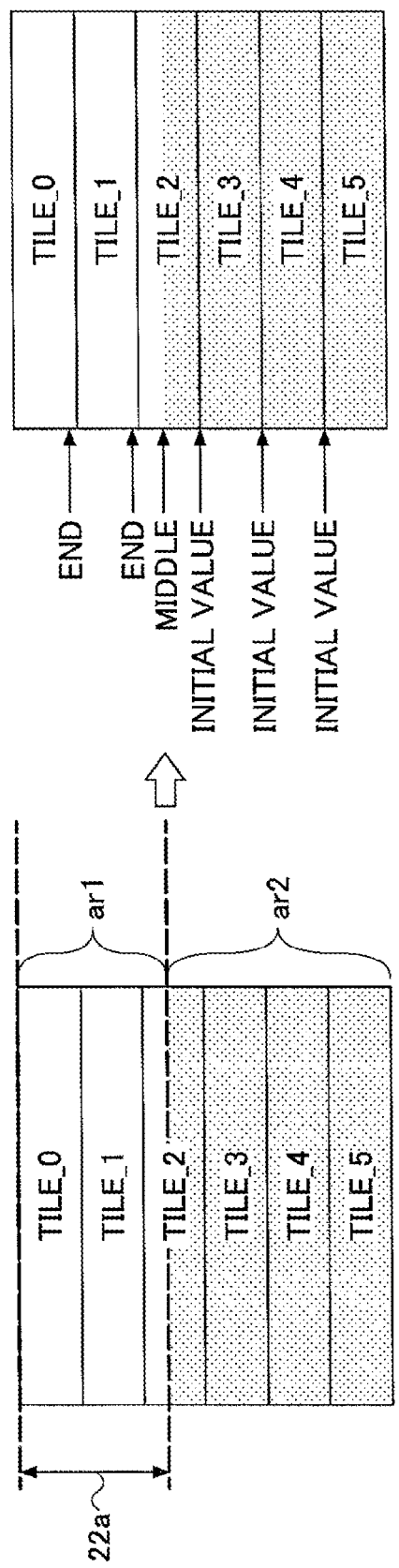

FIG.23

| GRAPHIC NUMBER RETAINING PART |
|---|
| 1 |

~123

~129

| TILE NUMBER | AGGREGATION VALUE OF DATA SIZES | GRAPHIC NUMBER |
|---|---|---|
| 0 | 0x0000_0020 | 1 |
| 1 | 0x0000_0050 | 0→1 |
| 2 | 0x0000_0060 | 0 |
| 3 | 0x0000_0098 | 0 |

~125

| SETTING PARAMETER | VALUE OF SETTING PARAMETER | GRAPHIC NUMBER |
|---|---|---|
| SETTING_A | VALUE OF SETTING_A_0 | 0 |
| SETTING_B | VALUE OF SETTING_B_0 | 0 |
| SETTING_C | VALUE OF SETTING_C_0 | 0 |

102

| MEMORY | 0x00 | 0x08 | 0x10 | 0x18 |
|---|---|---|---|---|
| 0x0780_0000 | TILE_START_0 | VALUE OF SETTING_A_0 | VALUE OF SETTING_B_0 | VALUE OF SETTING_C_0 |
| 0x0780_0020 | TRIANGLE_1 | | TILE_START_1 | VALUE OF SETTING_A_0 |
| 0x0780_0040 | VALUE OF SETTING_B_0 | VALUE OF SETTING_C_0 | TRIANGLE_1 | |

GRAPHIC NUMBER RETAINING PART — 123

| 2 |
|---|

INITIAL VALUE SAVE REGISTER — 119r

| 0x0000_0060 |
|---|

129

| TILE NUMBER | AGGREGATION VALUE OF DATA SIZES | GRAPHIC NUMBER |
|---|---|---|
| 0 | 0x0000_0028 | 2 |
| 1 | 0x0000_0058 | 2 |
| 2 | 0x0000_0078 | 0→2 |
| 3 | 0x0000_0098 | 0 |

125

| SETTING PARAMETER | VALUE OF SETTING PARAMETER | GRAPHIC NUMBER |
|---|---|---|
| SETTING_A | VALUE OF SETTING_A_0 | 0 |
| SETTING_B | VALUE OF SETTING_B_0 | 0 |
| SETTING_C | VALUE OF SETTING_C_0 | 0 |

MEMORY 102

| | 0x00 | 0x08 | 0x10 | 0x18 |
|---|---|---|---|---|
| 0x0780_0000 | TILE_START_0 | VALUE OF SETTING_A_0 | VALUE OF SETTING_B_0 | VALUE OF SETTING_C_0 |
| 0x0780_0020 | TRIANGLE_1 | TRIANGLE_2 | TILE_START_1 | VALUE OF SETTING_A_0 |
| 0x0780_0040 | VALUE OF SETTING_B_0 | VALUE OF SETTING_C_0 | TRIANGLE_1 | TRIANGLE_2 |
| 0x0780_0060 | TILE_START_2 | VALUE OF SETTING_A_0 | VALUE OF SETTING_B_0 | VALUE OF SETTING_C_0 |
| 0x0780_0080 | | | | |
| 0x0780_00A0 | | | | |
| 0x0780_00C0 | | | | |

| | GRAPHIC NUMBER RETAINING PART |
|---|---|
| | 3→4 |

~123

| | INITIAL VALUE SAVE REGISTER |
|---|---|
| | 0x0000_0060 |
| | 2 |

~119r

~129

| TILE NUMBER | AGGREGATION VALUE OF DATA SIZES | GRAPHIC NUMBER |
|---|---|---|
| 0 | 0x0000_0028 | 2 |
| 1 | 0x0000_0058 | 2 |
| 2 | 0x0000_0078 | 2 |
| 3 | 0x0000_0098 | 0 |
| ... | | |

~125

| SETTING PARAMETER | VALUE OF SETTING PARAMETER | GRAPHIC NUMBER |
|---|---|---|
| SETTING_A | VALUE OF SETTING_A_1 | 3 |
| SETTING_B | VALUE OF SETTING_B_0 | 0 |
| SETTING_C | VALUE OF SETTING_C_1 | 2 |
| ... | | |

DRAWING PROCESSING APPARATUS AND METHOD

CROSS-REFERENCE TO RELATED APPLICATIONS

This patent application is based upon and claims the benefit of priority of the prior Japanese Patent Application No. 2012-116842 filed on May 22, 2012, the entire contents of which are incorporated herein by reference.

FIELD

The embodiments discussed herein are related to a drawing processing apparatus and a drawing processing method, in which a tile type architecture is used.

BACKGROUND

As one of hardware configurations for realizing a three-dimensional drawing, a tile type architecture is applied. The tile type architecture divides a display screen into multiple small ranges (tiles), and a three-dimensional graphic is drawn for each of the tiles.

In a drawing processing apparatus using the tile type architecture, buffers are provided for a number of tiles. Scene data for internal drawing are read by a tile unit into the buffers. The drawing apparatus draws interior portions of each of the tiles based on the scene data for the corresponding tiles.

In the drawing processing apparatus, by using the buffers, it is possible to draw an image without accessing a memory which stores original scene data, so as to considerably reduce accesses to the memory.

In the drawing processing apparatus of the tile type architecture, it is possible to effectively use a cache memory which temporarily stores graphic data. The scene data corresponding to the respective tiles include a graphic index indicating at least a portion of a graphic to be drawn, and a setting parameter pertinent to the drawing of the graphic. In the following, the graphic index, a setting value of the setting parameter, and the like included in the scene data are collectively called "graphic description information".

The scene data of the tile unit is generated by sorting multiple sets of the scene data, which are generated by focusing on the graphics for the corresponding tiles. The scene data of the tile unit, which are generated by a conventional sort process, are represented by using a list structure in which a storage location of the graphic description information pertinent to the graphics included in each of the tiles is pointed at.

PATENT DOCUMENTS

Japanese National Publication of International Patent Application No. 2003-529859
Japanese Patent Application No. 2003-296747
Japanese Patent Application No. 2005-526517

SUMMARY

According to one aspect of the embodiment, there is provided a drawing processing apparatus including a determination part configured to specifying either one of a graphic index of a graphic included in a display screen and graphic description information which includes a setting parameter to be applied to the graphic, for each of regions dividing the display screen; an aggregation part configured to aggregate a data size of the graphic description information specified by the determination part for the regions; an address determination part configured to determine a start address in a memory into which the graphic description information of the regions is written to store the graphic description information of the regions into a successive storage area in the memory, based on the data size aggregated by the aggregation part; an overflow determination part configured to determine whether the overflow occurs in the memory; an initial value storage part configured to store a data size of an area of an overflow occurrence target when the overflow determination part determines that the overflow occurs; and a write part configured to write the graphic description information of the regions successively from the start address determined by the address determination part in a case in which the overflow determination part determines that the overflow does not occur, and to stop writing the graphic description information and resume a write process from the area of the overflow occurrence target by using the data size stored in the initial value storage part when the memory has a free space, in a case in which the overflow determination part determines that the overflow occurs.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 2 is a diagram illustrating an example of scene data generated by a scene data generation part;

FIG. 5 is a diagram illustrating an example of data retained in a tile buffer;

FIG. 6 is a diagram illustrating an example of data retained in a setting value retaining part;

FIG. 12 is a diagram illustrating an example of each of setting values after an initialization;

FIG. 13 is a diagram illustrating an example of each of the setting values after the graphic description information of a symbol X3 is input;

FIG. 15 is a diagram illustrating an example of each set of the setting values after the graphic description information indicated by a symbol X10 is input;

FIG. 16 is a diagram illustrating an example of each of the setting values after the graphic description information indicated by a symbol X13 is input;

FIG. 17 is a diagram illustrating an example of each of the setting values when a scene count ends;

FIG. 19 is a diagram illustrating an example of a tile buffer as a result of the address determination process;

FIG. 20 is a flowchart for explaining an example of a write process;

FIG. 21A and FIG. 21B are flowcharts for explaining an example of a write process;

FIG. 22A through FIG. 22C are diagrams for briefly explaining the write process;

FIG. 23 is a diagram illustrating an example of each of the setting values when the write process of a TRIANGLE_1 ends;

FIG. 25 is a diagram illustrating an example of each of the setting values when an overflow occurs;

FIG. 26 is a diagram illustrating an example of each of the settings after the overflow occurs;

DESCRIPTION OF EMBODIMENTS

Figure 1:
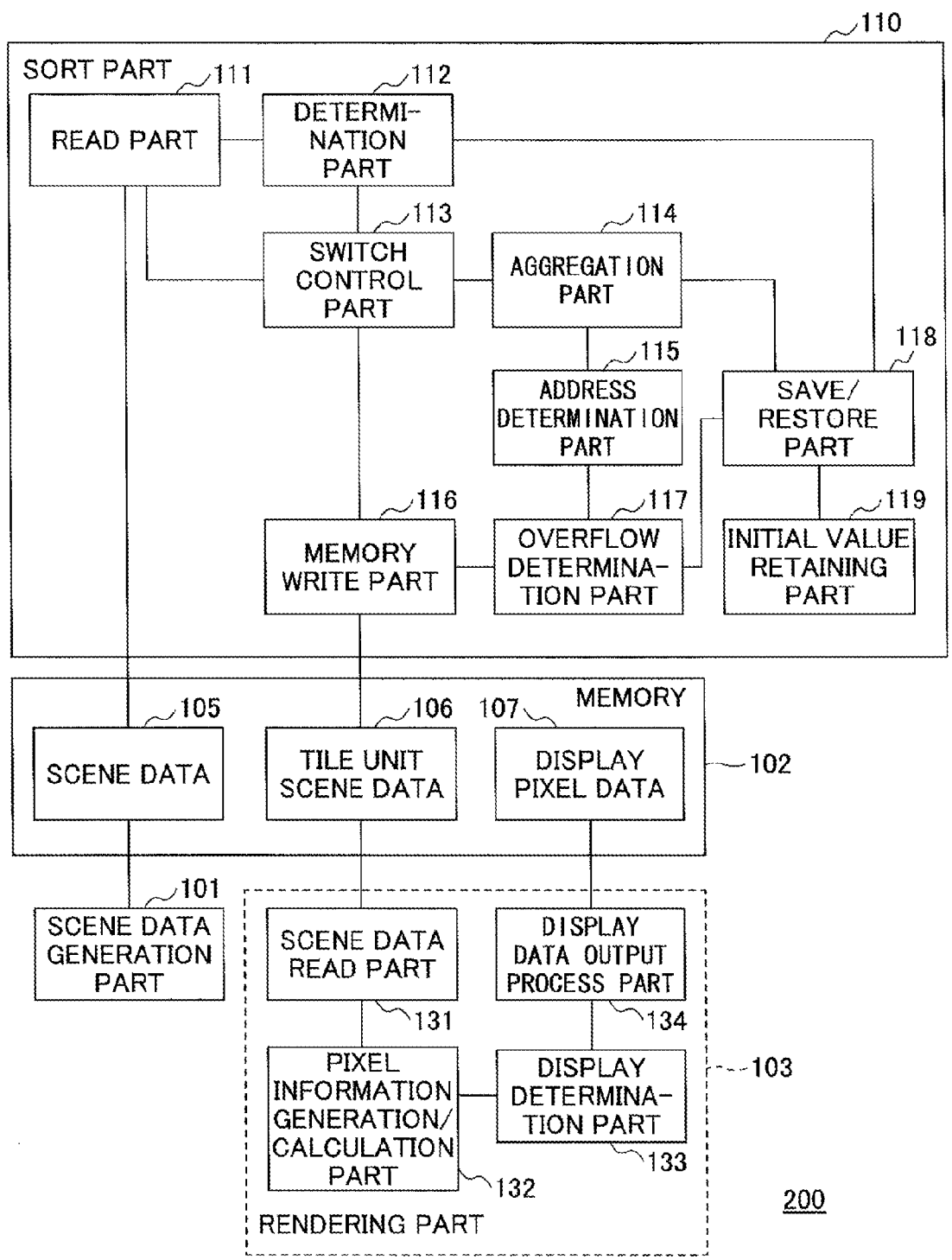
FIG. 1 is a block diagram illustrating an example of a configuration of a drawing processing apparatus in an embodiment.

In a related technology in which scene data of a tile unit have a list structure, in a case of storing the scene data of the tile unit, graphic indexes indicated by the list structure and addresses of setting parameters are discretely distributed in a memory space of a memory.

Thus, when conducting a drawing process for each of the tiles, a drawing processing apparatus reads out the graphic indexes and the setting parameters from various storage areas in the memory in accordance with the list structure. However, there is no continuity for addresses of the memory which the drawing processing apparatus accesses. Thus, it is difficult to realize an effective memory access such as burst access.

In the following, embodiments of the present invention will be described with reference to the accompanying drawings.

Embodiment

In a drawing processing apparatus 200 (FIG. 1) in an embodiment described below, the tile type architecture is used. Tiles correspond to regions acquired by dividing a display screen.

<Configuration of Drawing Processing Apparatus>

FIG. 1 is a block diagram illustrating an example of a configuration of the drawing processing apparatus in the embodiment. The drawing processing apparatus 200 illustrated in FIG. 1 includes a scene data generation part 101, a memory 102, a rendering part 103, and a sort part 110.

The scene data generation part 101 generates the scene data focusing on respective graphs, and stores the scene data into the memory 102. In the example illustrated in FIG. 1, scene data 106 are regarded as the scene data stored in the memory 102.

The sort part 110 conducts a sort process for reading out the scene data 106 and sorting the tiles, each of which is a unit. Scene data 106 of the tile units acquired by the sort process are stored in the memory 102.

The sort part 110 in FIG. 1 includes a read part 111, a determination part 112, a switch control part 113, an aggregation part 114, an address determination part 115, a memory write part 116, an overflow determination part 117, a save/restore part 118, and an initial value retaining part 119. In the example in FIG. 1, the scene data of the tile units stored in the memory 102 are illustrated as the scene data 106. The sort process of the sort part 110 will be described in detail.

The rendering part 103 includes a scene data read part 131, a pixel information generation/calculation part 132, a display determination part 133, and a display data output process part 134.

The scene data read part 131 reads out the scene data 106 of the tile units described above sequentially for each of the tiles.

The pixel information generation/calculation part 132 conducts a calculating process based on generation of pixel information and texture information based on the scene data read by the scene data read part 131.

The display determination part 133 conducts a Z test, a stencil test, and the like with respect to pixel data acquired by a process of the pixel information generation/calculation part 132. By these test processes, it is determined whether each of pixels is to be displayed.

The display data output process part 134 stores the pixel data which are determined as a display target by the display determination part 133. In the example in FIG. 1, the pixel data stored in the memory 102 are illustrated as display pixel data 107.

The scene data of each of the tiles are included in the scene data 106 of the tile units illustrated in FIG. 1. If the scene data 106 of each of the tiles are successively arranged in a storage area of the memory 102, it becomes possible for the scene data read part 131 to read out the scene data by burst transmission. Thus, it is possible to effectively access the memory 102.

The rendering part 103 entirely reads out the scene data for the tiles included in a drawing region from the memory 102, and sequentially uses the scene data for the drawing process of corresponding the tiles.

In the following, a method is disclosed for successively storing the scene data 106 of each of the tiles into the storage area of the memory 102.

FIG. 2 is a diagram illustrating an example of the scene data generated by the scene data generation part 101. The scene data include a setting value for each of the setting parameters, the graphic index indicating the graph to draw, and tile identification indicating a tile where the graph is arranged as the graphic description information. The setting parameter indicates a parameter applied to the graphic. Symbols "X1", "X2", "X3", . . . illustrated in FIG. 2 correspond to respective sets of the graphic description information included in the scene data.

In the example illustrated in FIG. 2, the setting values to set to the setting parameters A, B, and C are indicated such as a "SETTING A_k", a "SETTING B_k", a "SETTING C_k". These setting values may be distinguished by a numeral k which is combined with each of letters "A", "B", and "C" which indicate types of the setting parameters. The numeral k may indicate an appearance order of the setting values in the scene data.

In the example illustrated in FIG. 2, as examples of the graphic indexes, a "TRIANGLE_1", a "TRIANGLE_2" and the like are illustrated. The tile, where the graphic indicated by the graphic index is arranged, is specified by the tile identification being read following the graphic indexes.

In the example of the scene data illustrated in FIG. 2, tiles "TILE_0" and "TILE_1" follow after a graphic index "TRIANGLE_1". In this case, the "TRIANGLE_1" includes the tiles "TILE_0" and "TILE_1". Hereinafter, an example of using a tile number as the tile identification will be described below.

Also, in the scene data illustrated in FIG. 2, the setting parameters, where the setting values are set to the setting values prior to the graphic indexes, are applied to drawing of the graphic. As the setting parameters A, B, and C, a "SETTING A_0", a "SETTING B_0", and a "SETTING C_0" are applied in common for graphics "TRIANGLE_1" and "TRIANGLE_2".

Figure 3:
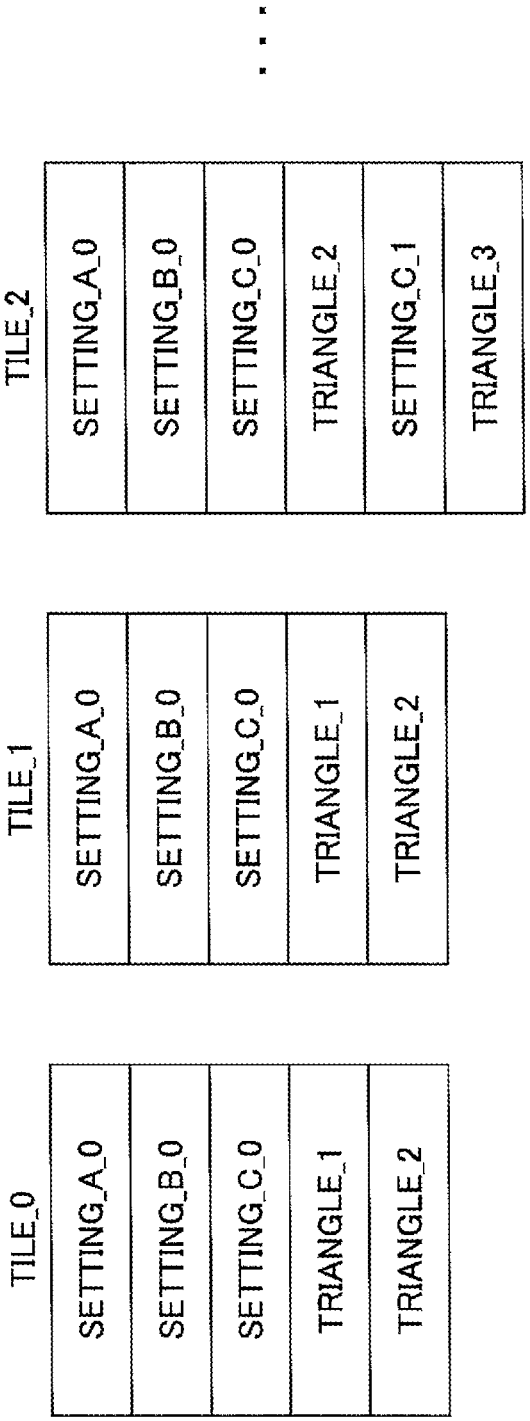
FIG. 3 is a diagram illustrating an example of the scene data sorted for each of tiles.

FIG. 3 is a diagram illustrating an example of the scene data sorted for each of the tiles. Each set of the graphic description information included in the scene data illustrated in FIG. 2 is sorted for the corresponding titles by the sort part 110, as illustrated in FIG. 3. Each set of the scene data 106 of the tile units including the graphic description information sorted for the corresponding tiles have a different length.

Accordingly, if the length of the scene data 106, which correspond to the tiles successively lined up in a drawing range, is estimated, multiple sets of the scene data 106 may be stored in successive storage areas of the memory 102.

The read part 111 of the sort part 110 illustrated in FIG. 1 sequentially reads the graphic description information from the scene data 106 in the memory 102.

The determination part 112 determines the graphic description information included in the scene data corresponding to the tiles by conducting a determination process, which will be described later, in multiple sets of the graphic description information being successively read. The determination part 112 determines the graphic description information including the graphic indexes of the graphics included in the display screen or the setting parameters to apply to these graphic indexes, for each of the tiles dividing the display screen. A determination result is output through the switch control part 113 to the aggregation part 114 or the memory write part 116.

The aggregation part 114 conducts a process for aggregating data sizes of the multiple sets of the graphic description information for each of the tiles with respect to the graphic description information of the determination result acquired from the switch control part 113. The aggregation part 114 may acquire a total of the data sizes of the multiple sets of the graphic description information included in the scene data corresponding to the tiles.

The address determination part 115 determines a beginning address to write the multiple sets of the graphic description information for each of the tiles based on the data sizes aggregated by the aggregation part 114, so as to store the multiple sets of the graphic description information in successive storage areas in the memory 102. The address determination part 115 may determine beginning addresses of the multiple sets of the scene data corresponding to the tiles, so as to successively arrange the multiple sets of the scene data in the storage areas in the memory 102 in an order of the tile numbers.

The overflow determination part 117 determines whether an overflow occurs in the memory 102 when the graphic description information for each of tiles are written by the memory write part 116. The overflow occurs in a state in which all data are written in a predetermined storage area of the memory 102 and data are not written any more. The overflow determination part 117 conducts an overflow determination by determining whether the data exceed a size allotted to the scene data 106 of the tile units in the memory 102 based on the beginning address for each of the tiles.

When it is determined that the overflow may occur, the overflow determination part 117 instructs the memory write part 116 to stop a write process when the overflow occurs.

Also, when the overflow occurs, the overflow determination part 117 instructs the save/restore part 118 to save an initial value. The initial value may indicate an aggregation value (data size) of the tile in which it is determined that the overflow occurs.

Moreover, when the overflow determination part 117 is reported from the memory write part 116 that an area of the scene data 106 of the tile units being a write target becomes free, the overflow determination part 117 reports a resumption of the write process to the save/restore part 118.

Figure 24:
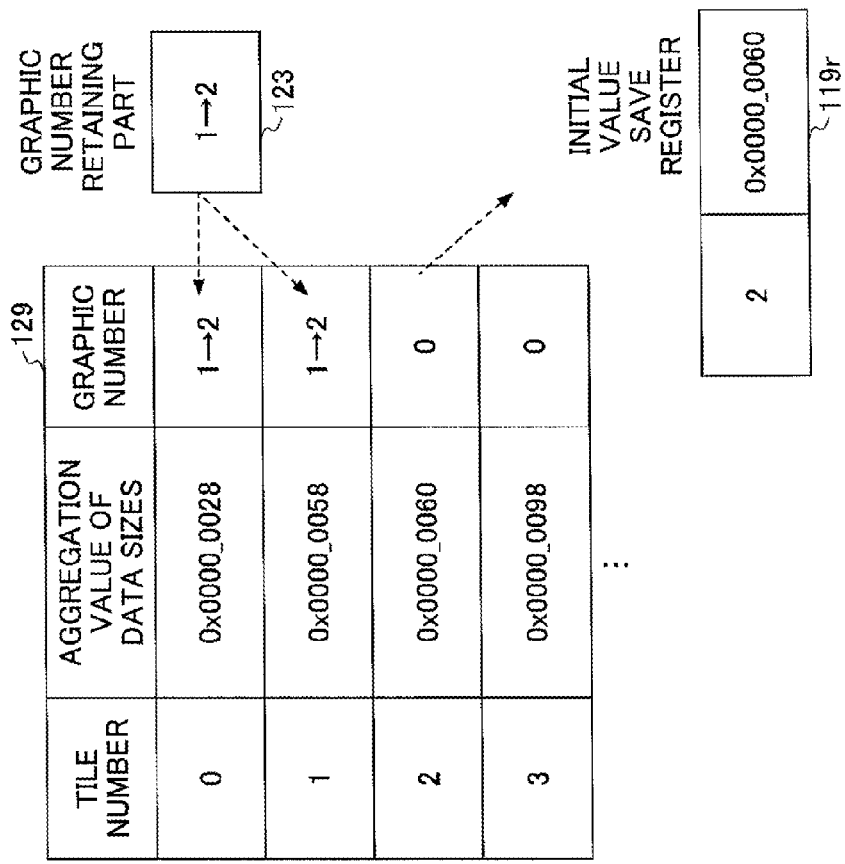
FIG. 24 is a diagram illustrating an example for each of the setting values when the write process of a TRIANGLE_2 is conducted.

When the save/restore part 118 receives an instruction to save the initial value from the overflow determination part 117, the save/restore part 118 stores the initial value of the data size aggregated by the aggregation part 114 for the tile of an overflow target. The initial value retaining part 119 may be an initial value save register 119r (FIG. 24).

When the write process is resumed, the save/restore part 118 restores the initial value which is saved in the initial value retaining part 119, to be the aggregate value of the aggregation part 114. The resumption of the write process is indicated by the overflow determination part 117.

The initial value retaining part 119 stores the initial value of the aggregation value (data size) of a predetermined tile by the save/restore part 118.

As described above, after the beginning address of the storage area of the data scene corresponding to each of the tiles is determined, the switch control part 113 instructs the read part 111 again to read the scene data 106.

The switch control part 113 outputs the determination result acquired by the determination process related to the graphic description information which is read again, to the memory write part 116. Also, even in a case of memory writing, the aggregation value of the data sizes of the tiles is updated. Thus, the switch control part 113 outputs the determination result to the aggregation part 114.

The memory write part 116 sequentially writes the multiple sets of the graphic description information indicated by the determination result in the storage area which is indicated by the beginning addresses corresponding to the tiles. The memory write part 116 performs a memory write process as described above until the memory write part 116 receives an instruction from the overflow determination part 117. By this configuration, it is possible to store the multiple sets of the scene data corresponding to the tiles in the successive storage areas of the memory 102.

When the overflow determination part 117 reports to the memory write part 116 that the overflow may occur, the memory write part 116 writes the multiple sets of the graphic description information not to exceed a memory size which is set beforehand. The memory write part 116 stops the write process in a case of exceeding the memory size.

When the scene data are read by the scene data read part 131 and the storage area for the scene data 106 of the tile units becomes free, the memory write part 116 reports it to the overflow determination part 117.

The memory write part 116 writes the scene data corresponding to the tile of the overflow target into the memory 102 by using the initial value being restored.

As described above, since a data size of the scene data is stored for each of the tiles after the sort process, the data size becomes greater than that before the sort process, and a greater area is demanded in the memory 102. However, the memory size is restricted.

Therefore, it may be desired to restrict the size of the memory for storing the scene data after the sort process. According to the embodiment, by performing the overflow determination with respect to a predetermined area in the memory 102 to store the scene data after the sort process, even in a case of restricting the memory size, it is possible to conduct a proper drawing process. An overflow determination process and a write resume process will be described later with reference to a concrete example.

<Configuration of Sort Part>

Figure 4:
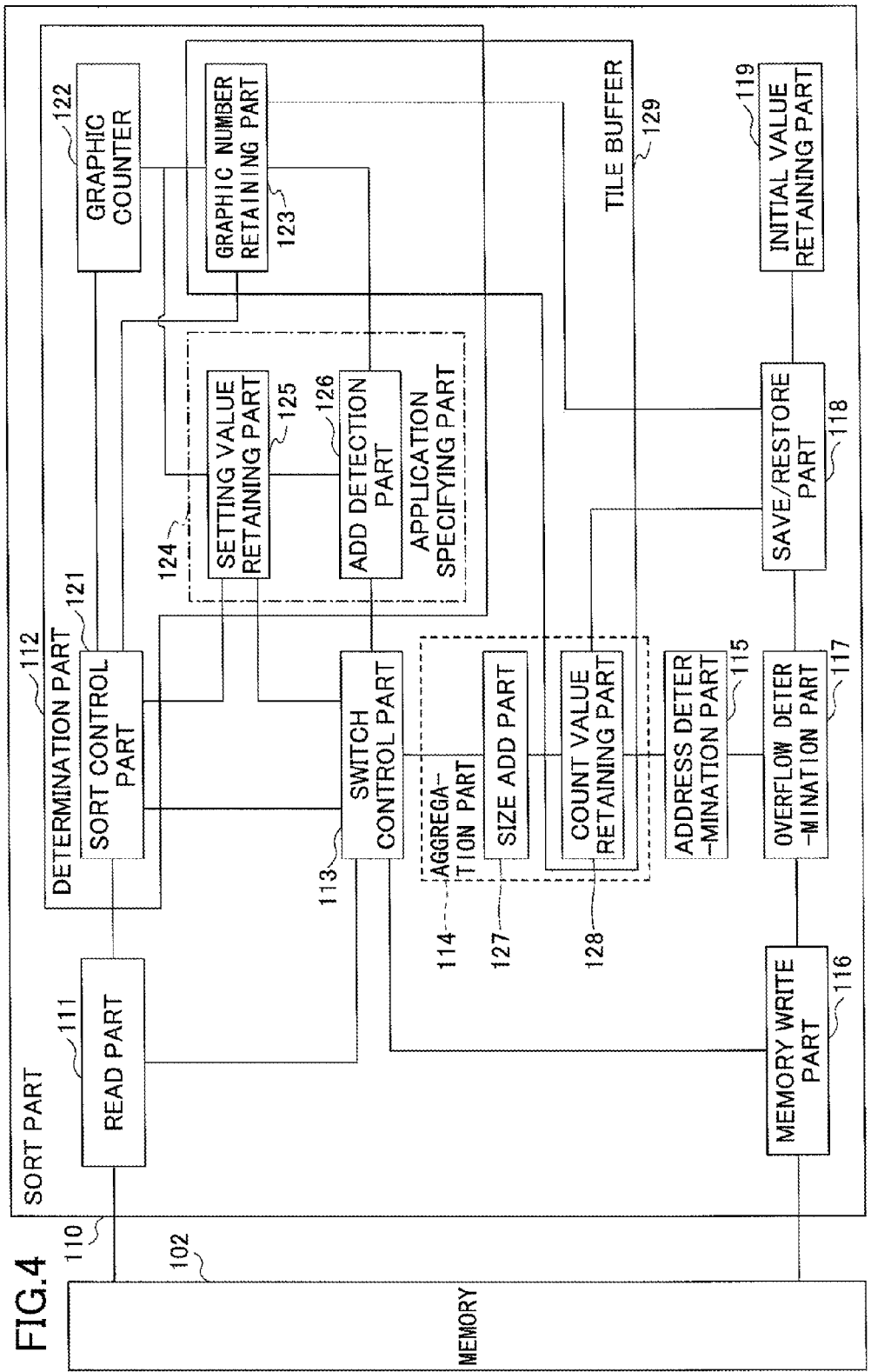
FIG. 4 is a block diagram illustrating an example of a configuration of a sort part in the embodiment.

Next, a simplified hardware configuration of the sort part 110 will be described. FIG. 4 is a block diagram illustrating an example of a configuration of the sort part in the embodiment. In the example illustrated in FIG. 4, parts that are the same as those illustrated in FIG. 1 are given by the same reference numbers. The sort part 110 will be mainly described below.

The determination part 112 illustrated in FIG. 4 includes a sort control part 121, a graphic counter 122, a graphic number retaining part 123, and an application specifying part 124. Moreover, the application specifying part 124 includes a setting value retaining part 125 and an add detection part 126.

The sort control part 121 determines a type of the graphic description information which is read out by the read part 111 from the scene data 106 in the memory 102. The sort control part 121 controls operations of the graphic counter 122, the graphic number retaining part 123, the setting value retaining part 125, and the add detection part 126 based on the type of the graphic description information.

The graphic counter 122 generates a graphic number corresponding to a latest graphic index in the scene data which have been read, in response to an indication from the sort control part 121.

The graphic number retaining part 123 may correspond to a register, and retains a tile number of the tile in which the graphic number generated by the graphic counter 122 is indicated, in response to the instruction from the sort control part 121.

The setting value retaining part 125 retains each of the setting values of the setting parameters. The setting values are output from the sort control part 121. Also, the setting value retaining part 125 retains the graphic number generated by the graphic counter 122 by corresponding to the setting parameters having the setting values every time a new setting value is retained.

The add detection part 126 detects the setting parameter to add to the graphic description information of the indicated tile number by referring to information of the graphic number retaining part 123 and information of the setting value retaining part 125 in response to the instruction from the sort control part 121.

On the other hand, the graphic index to be included in the graphic description information for each of the tiles is determined from the scene data by the sort control part 121, as described later.

Moreover, the aggregation part 114 illustrated in FIG. 4 includes a size add part 127, and a count value retaining part 128. The count value retaining part 128 retains the aggregation value indicating a data length of the graphic description information included in the scene data of the tile units in response to each of the tile numbers.

The size add part 127 adds an increase of the data length corresponding to the type of the graphic description information included in the determination result acquired through the switch control part 113 to the aggregation value corresponding to the indicated tile number.

The graphic number retaining part 123 and the count value retaining part 128 may be integrated into a tile buffer 129 including retaining areas corresponding to respective tile numbers.

FIG. 5 is a diagram illustrating an example of data retained in the tile buffer 129. In the example illustrated in FIG. 5, the tile buffer 129 retains aggregation values $D_0, D_1, D_2, \ldots$ and graphic numbers $NT_0, NT_2, NT_2, \ldots$ indicating the latest graphics included in respective tiles, by corresponding to the tile numbers specifying respective tiles. In the example in FIG. 5, suffixes for the aggregation values D and the graphic numbers NT indicate the respective tile numbers.

FIG. 6 is a diagram illustrating an example of data retained in the setting value retaining part 125. In the example illustrated in FIG. 6, the setting value retaining part 125 retains the latest setting values A_na, B_nb, and C_nc, and the graphic numbers $NP_A$, $NP_B$, and $NP_C$ of graphics in which these setting values A_na, B_nb, and C_nc become valid, for setting parameters A, B, and C. In the example illustrated in FIG. 6, the setting values set to the setting parameters are specified by applying numbers (na, nb, and nc) which indicate an appearance over in the setting values for the same type in the scene data. The types of the setting parameters may be more or less than this example.

<Drawing Control Process>

Figure 7:
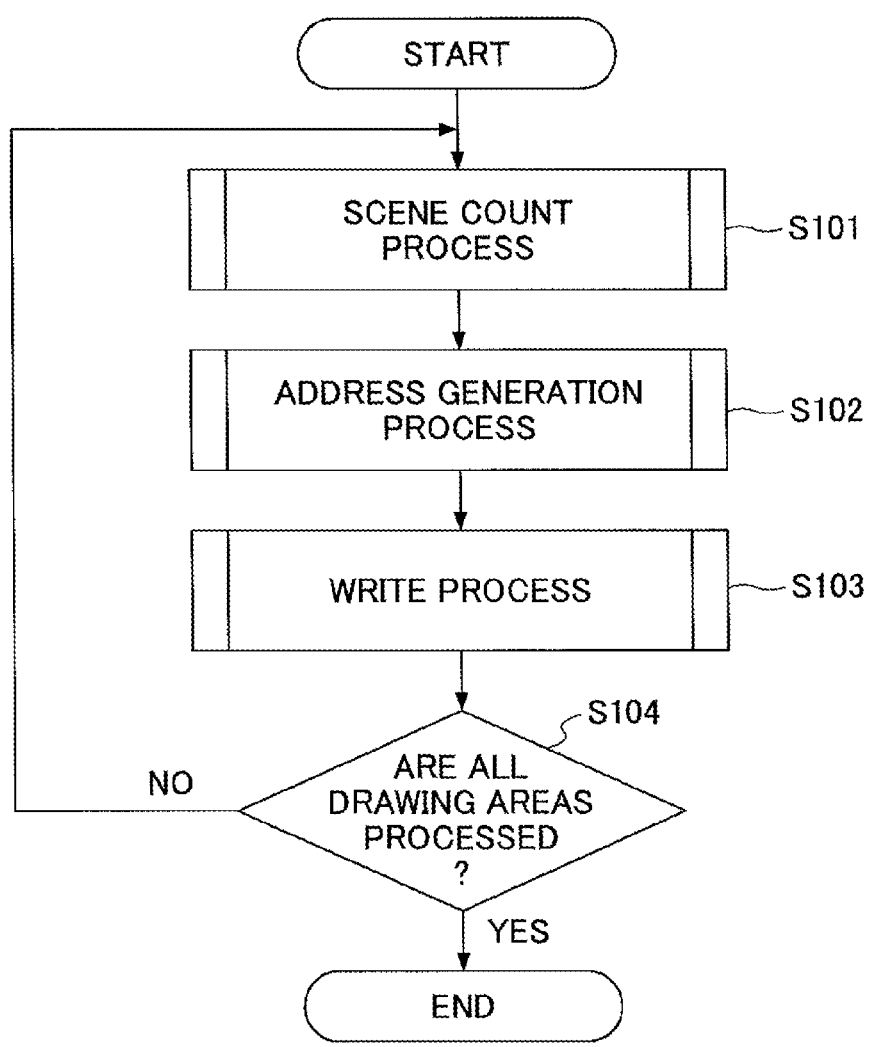
FIG. 7 is a flowchart for explaining an example of a drawing control process in the embodiment.

Next, a drawing control process will be described in the embodiment. FIG. 7 is a flowchart for explaining an example of the drawing control process in the embodiment. In step S101 in FIG. 7, the determination part 112 and the aggregation part 114 conduct a scene count process. The scene count process is conducted to aggregate data sizes of the multiple sets of the graphic description information for each of the tiles.

In step S102, the address determination part 115 determines the beginning address in the memory 102 to write the graphic description information of each area based on an aggregation result of the data sizes, in order to store the graphic description information for the tiles in successive storage areas.

In step S103, the memory write part 116, the overflow determination part 117, and the like conduct the write process to write the graphic description information for each of the tiles. In this case the memory write part 116 is controlled not to write the graphic description information in an area other than a predetermined area in the memory 102. In step S104, it is determined whether all drawing areas are processed. When all the drawing areas are not processed (NO in step S104), the drawing control process goes back to step S101 and repeats the above described process. When all the drawing areas are processed (YES in step S104), the drawing control process is terminated. Next, each of processes will be described in detail.

<<Determination Process>>

Figure 8:
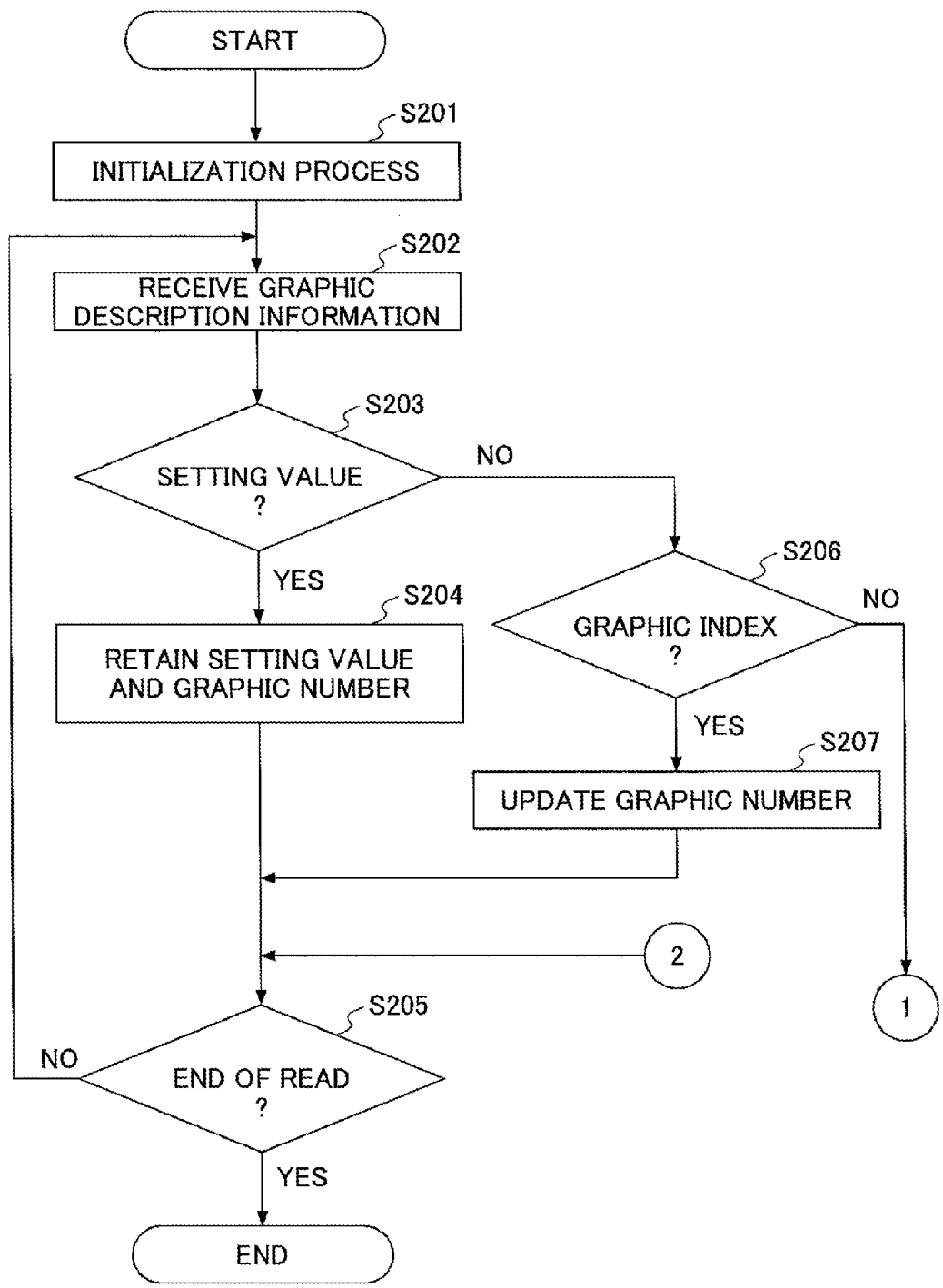
FIG. 8 illustrates a flowchart for explaining an example of a determination process.
Figure 9:
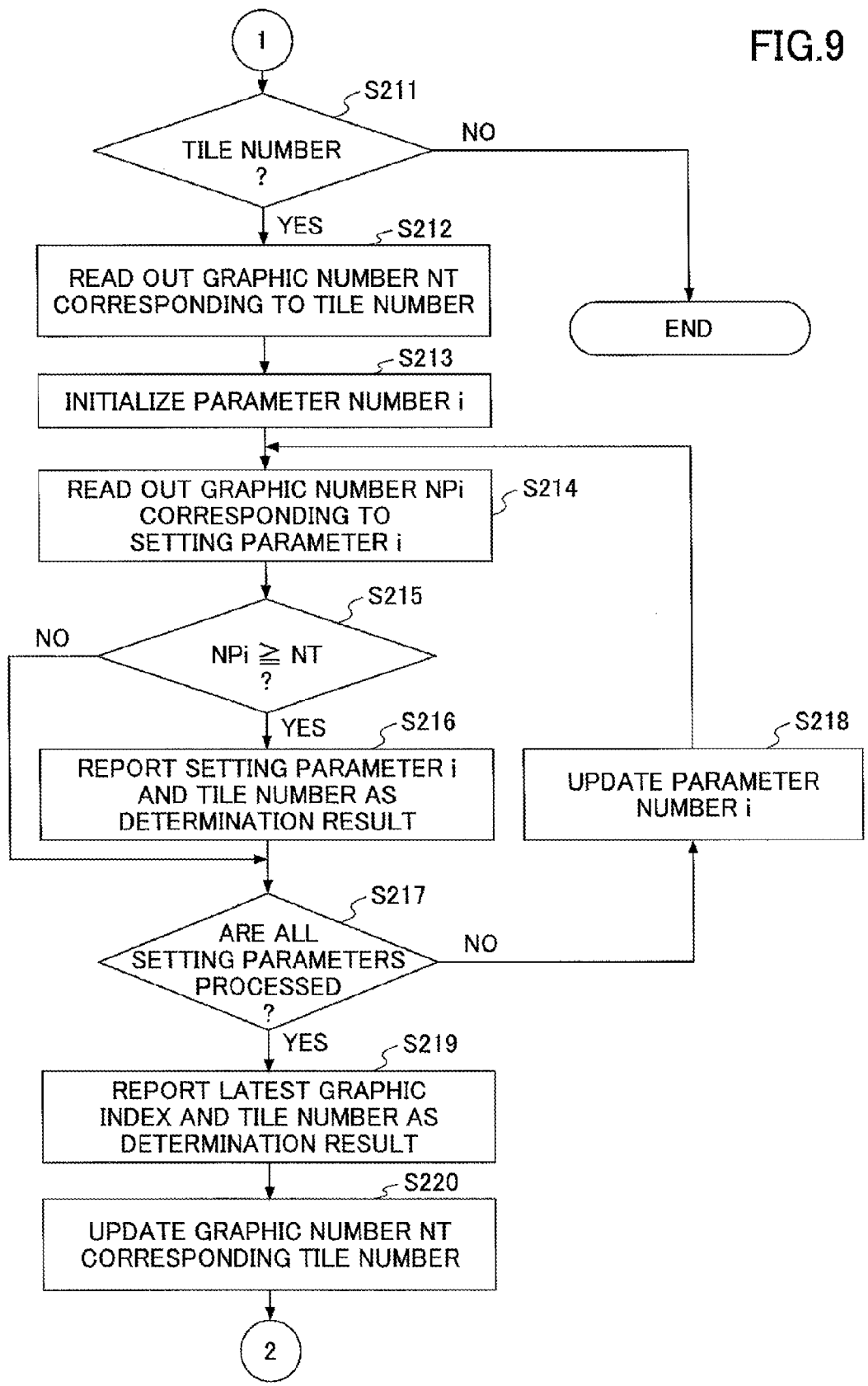
FIG. 9 illustrates the continuing flowchart for explaining the example of the determination process.

Next, a determination process of the graphic description information in the scene count process will be described. FIG. 8 and FIG. 9 illustrate a flowchart for explaining an example of the determination process.

In step S201, the read part 111 initializes a count value of the graphic counter 122, and contents of the tile buffer 129 and the setting value retaining part 125 to clear values thereof.

In step S202, the sort control part 121 sequentially receives the multiple sets of the graphic description information which are read by the read part 111 from the scene data 106 in the memory 102.

In step S203, the sort control part 121 determines whether the graphic description information acquired from the memory 102 is the setting value of the setting parameter. When the graphic description information is the setting value of the setting parameter (YES in step S203), the sort control part 121 advances to step S204. When the graphic description information is not the setting value of the setting parameter (NO in step S203), the sort control part 121 advances to step S206.

In step S204, the sort control part 121 retains the setting value and the graphic number indicated by the count value of the graphic counter 122 in the setting value retaining part 125.

In step S205, the sort control part 121 determines whether reading of the graphic description information ends. When the reading of the graphic description information ends (YES in step S205), the sort control part 121 ends the determination process. When the reading of the graphic description information has not ended (NO in step S205), the sort control part 121 goes back to step S202.

In step S206, the sort control part 121 determines whether the graphic description information acquired from the memory 102 is the graphic index. When the graphic description information is the graphic index (YES in step S206), the sort control part 121 advances to step S207. When the graphic description information is not the graphic index (NO in step S206), the sort control part 121 advances to step S211 in FIG. 9.

In step S207, the sort control part 121 updates the graphic number retained in the graphic counter 122.

In step S211 in FIG. 9, the sort control part 121 determines whether the graphic description information is the tile number. When the graphic description information is the tile number (YES in step S211), the sort control part 121 advances to step S212. When the graphic description information is not the tile number (NO in step S211), the sort control part 121 terminates the determination process.

In step S212, the sort control part 121 determines that the tile indicated by the tile number is an arrangement destination of the graphic index acquired prior to the tile number. In this case, the sort control part 121 instructs the add detection part 126 to detect the setting parameters to apply for a respective graphic before outputting the determination result related to the graphic index described above. The add detection part 126 reads out the graphic number NT corresponding to the tile number described above from the graphic number retaining part 123 of the tile buffer 129 in response to an instruction from the sort control part 121. After that, the add detection part 126 detects one or more setting parameters to be added to the graphic description information of the tile indicated by the above described tile number, from the setting parameters.

In step S213, the add detection part 126 initializes a parameter number i which selectively indicates one of the setting parameters.

In step S214, the add detection part 126 reads out the graphic number NPi retained in the setting value retaining part 125 by corresponding to the setting parameter i indicated by the parameter number i.

In step S215, the add detection part 126 determines whether the graphic number NPi is greater than or equal to the graphic number NT corresponding to the above described tile number. When this condition is satisfied (YES in step S215), the add detection part 126 advances to step S216. When this condition is not satisfied (NO in step S215), the add detection part 126 advances to step S217.

In step S216, the add detection part 126 determines that the setting parameter i is to be added to the graphic description information of the tile indicated by the tile number. In this case, the add detection part 126 reports the determination result including the above described tile number and the parameter number i to the switch control part 113.

In step S217, the add detection part 126 determines whether the above described process is performed for all setting parameters. When the above described process is completed for all setting parameters (YES in step S217), the add detection part 126 advances to step S219. When the above described process is not completed for all setting parameters (NO in step S217), the add detection part 126 advances to step S218.

In step S218, the add detection part 126 updates the parameter number i and conducts the process for a next setting parameter.

In the above explanation, the parameter number i is used to identify respective setting parameters. Alternatively, a setting parameter name may be used as an identification of the setting parameter.

In step S219, the sort control part 121 reports the determination result including the above described tile number and the latest graphic index to the switch control part 113.

In step S220, the sort control part 121 updates the graphic number corresponding to the tile number of the graphic number retaining part 123 of the tile buffer 129. After a process in step S220, the sort control part 121 advances to step S205 in FIG. 8.

In the determination part 112, the above described process is performed with respect to the graphic description information read by the read part 111. Hence, it is possible to categorize the set of the graphic description information included in the scene data for each of the tiles.

<<Switch Control>>

Figure 10:
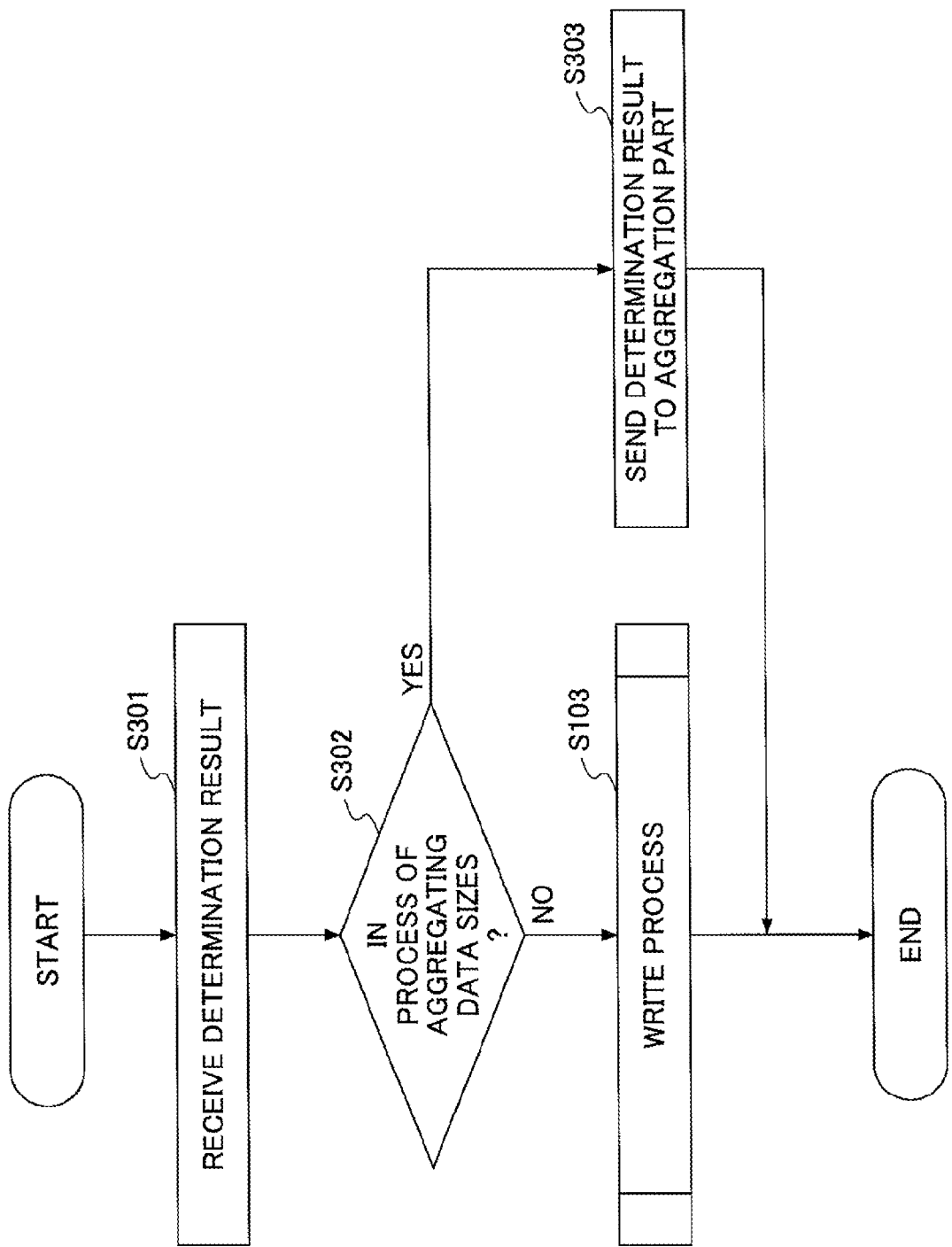
FIG. 10 is a flowchart for explaining an example of a switch control process.

Next, a process of the switch control part 113 will be described. FIG. 10 is a flowchart for explaining an example of the switch control process.

In step S301, the switch control part 113 receives the determination result from the determination part 112. In step S302, the switch control part 113 determines whether aggregating of the data sizes is in process every time the switch control part 113 receives the determination result. When the aggregating of the data sizes is in process (YES in step S302), the switch control part 113 advances to step S303. When the aggregating of the data sizes is not in the process (NO in step S302), the switch control part 113 advances to step S103.

In step S303, the switch control part 113 determines that the aggregating of the data sizes is in process during processes in step S101 and S102 in FIG. 7 to estimate a length of the scene data, and outputs the determination result itself acquired from the determination part 112 to the aggregation part 114.

When the above described processes for estimating the length of the scene data are conducted, the aggregation part 114 operates in parallel to a read process by the read part 111 and the determination process by the determination part 112.

<<Aggregation Process>>

Figure 11:
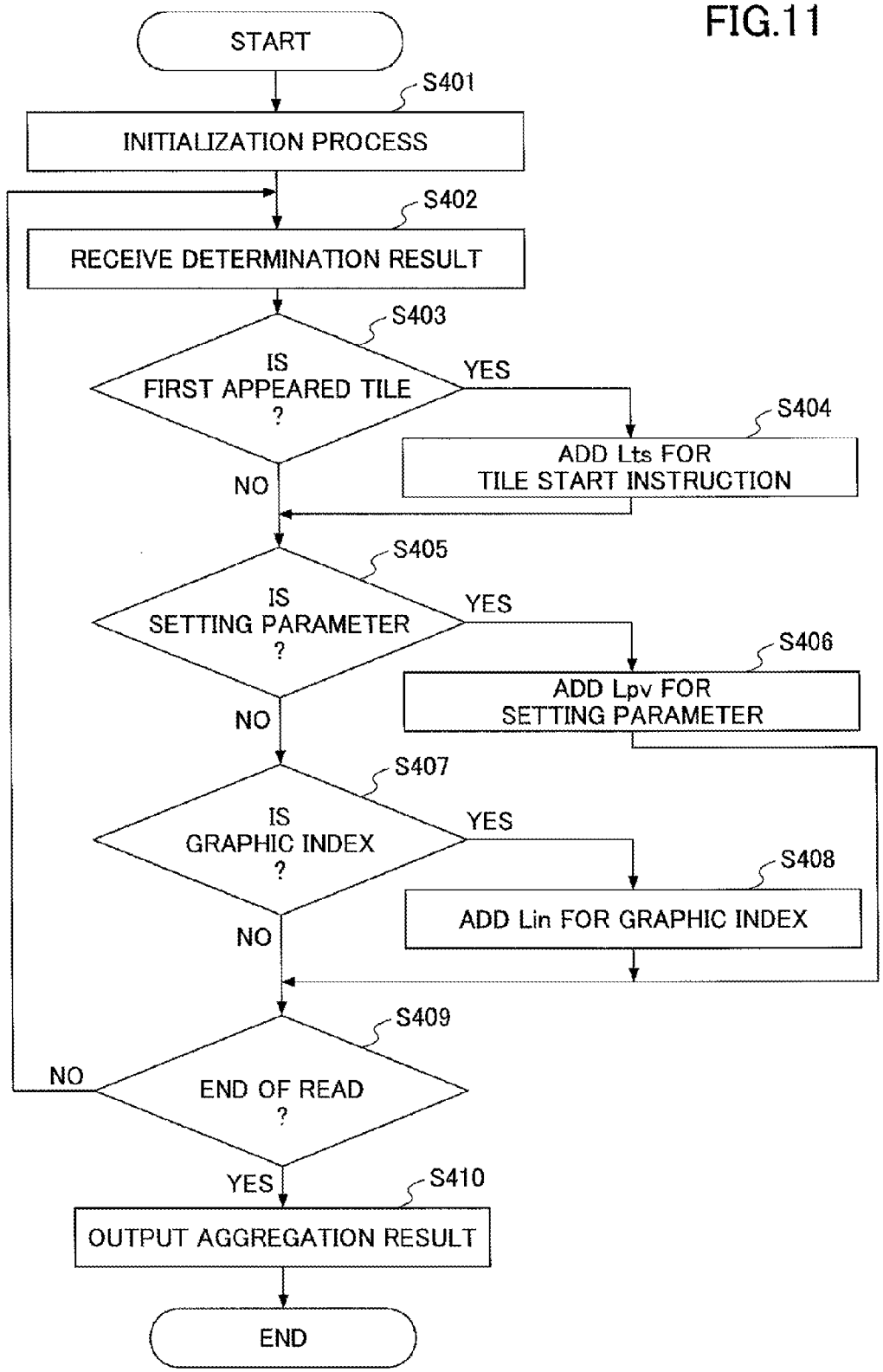
FIG. 11 illustrates a flowchart for explaining an example of an aggregation process.

Next, the process of the aggregation part 114 will be described. FIG. 11 illustrates a flowchart for explaining an example of the aggregation process.

In step S401, the aggregation part 114 initialize the count value retaining part 128 of the tile buffer 129 by clearing contents thereof.

In step S402, the aggregation part 114 receives the determination result via the switch control part 113.

In step S403, the aggregation part 114 determines whether a new tile number is included in the determination result every time the aggregation part 114 acquires the determination result. When the new tile number is included in the determination result (YES in step S403), the aggregation part 114 advances to step S404. When the new tile number is not included in the determination result (NO in step S403), the aggregation part 114 advances to step S405.

In step S404, the size add part 127 adds a data length Lts of a tile start instruction to the count value retaining part 128 in response to the new tile number.

In step S405, the size add part 127 determines whether the above described determination result indicates addition of the setting parameter. If the determination result includes the identification of the setting parameter, it may be determined that the determination result indicates addition of the setting parameter.

If the determination result includes the identification of the setting parameter (YES in step S405), the size add part 127 advances to step S406. If the determination result does not include the identification of the setting parameter (NO in step S405), the size add part 127 advances to step S407.

In step S406, the size add part 127 adds the data length Lpv of the setting value to set the setting parameter to the aggregation value of the tile number included in the determination result. In a case in which data lengths of the setting parameters are different, the size add part 127 may add a different data length Lpv to the aggregation value in response to the identification of the setting parameter.

In step S407, the size add part 127 determines whether the above described determination result indicates addition of the graphic index. In a case I which the graphic index is included in the determination result, the determination result may indicate the addition of the graphic index.

When the graphic index is included in the determination result (YES in step S407), the size add part 127 advances to step S408. When the graphic index is not included in the determination result (NO in step S407), the size add part 127 advances to step S409.

In step S408, the size add part 127 adds a data length Lin of graphic index to the aggregation value of the tile number included in the determination result.

In step S409, the size add part 127 determines whether the read part 111 completes the reading of the scene data. When the read part 111 completes the reading of the scene data (YES in step S409), the size add part 127 advances to step S410. When he read part 111 does not complete the reading of the scene data (NO in step S409), the size add part 127 advances back to step S402 and conducts the aggregation process based on a new determination result. Processes in steps S405 and S406 related to the setting parameter may be conducted before processes in steps S407 and S408 related to the graphic index.

The above described processes in steps S402 through S409 are repeated for the determination results corresponding to all sets of the graphic description information included in the scene data.

In step S410, when this aggregation process is completed, the aggregation part 114 outputs the aggregation value which corresponds to the tile number and is retained in the count value retaining part 128, as an estimation result of a length of the scene data corresponding to the tile.

<<Example of Update by Scene Count>>

Next, in the estimation process of the length of the scene data, updates of the setting value retaining part 125, the tile buffer 129, and graphic number retaining part 123 will be described with reference to the example of the scene data in FIG. 2. For ease of explanation, each set of data in FIG. 2 is eight bytes of data. The setting value retaining part 125 may be realized by a buffer or the like, and the graphic number retaining part 123 may be realized by a register or the like.

[1] Initialization.

By the process of step S201 in FIG. 8, the setting value retaining part 125, the tile buffer 129, and the graphic number retaining part 123 are entirely initialized by zero values. FIG. 12 is a diagram illustrating an example of each of the setting values after the initialization.

[2] Process of the Setting Values Before the Graphic is Input.

FIG. 13 is a diagram illustrating an example of each of the setting values after the graphic description information of the symbol X3 is input. As illustrated in FIG. 13, the setting value of the setting parameter corresponds to the symbol X3 in the setting value retaining part 125. Since the graphic has not been input, the graphic number is retained as zero (the process end until the symbol X3).

[3] Process in a Case in which the Graphic is Input for a First Time.

Figure 14:
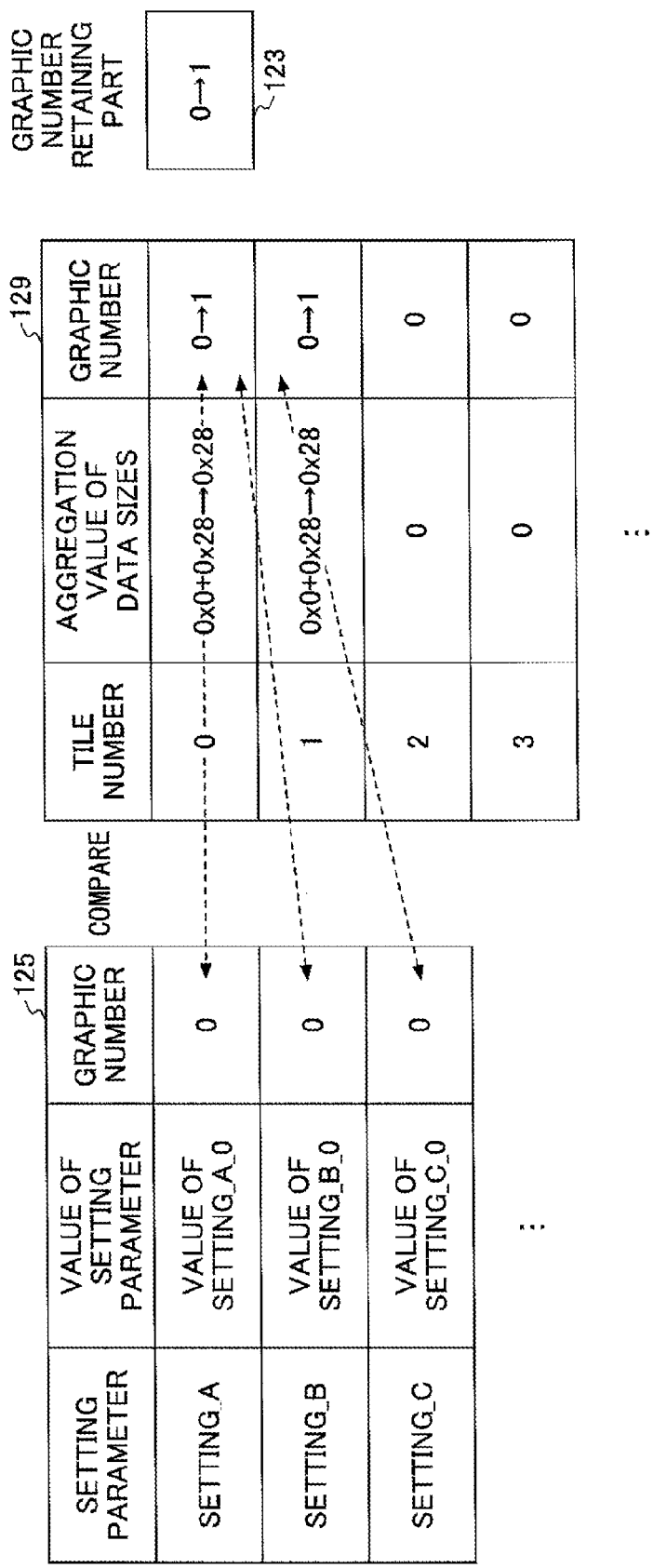
FIG. 14 is a diagram illustrating an example of each of the setting values after the graphic description information of a symbol X6 is input.

FIG. 14 is a diagram illustrating an example of each of the setting values after the graphic description information of the symbol X6 is input. When a graphic TRIANGLE_1 is input, the graphic number retaining part 123 is updated to be 1. When a tile location is input, the graph is input for a first time in the TILE_0. The graphic numbers of respective settings of the setting value retaining part 125 are compared with the graphic number of the tile buffer 129 (step S215).

As a comparison result, since the graphic numbers of the setting values correspond to the graphic numbers of the tiles, it is determined that the setting values are to be updated. Accordingly, as illustrated in FIG. 14, for the count value of the TILE_0, the data length Lts of the tile start instruction (8 bytes) (step S404), a total size of the data lengths Lpv of the setting parameters (8 bytes×3) (step S406), and total 40 bytes (0x28) of the data lengths Lin of the graphic indexes indicating graphics (step S408) are stored to add in the tile buffer 129. Similarly, the update is conducted for the TILE_1 (the aggregation process ends until the symbol X6).

[4] Process in a Case Once the Graphic is Input.

FIG. 15 is a diagram illustrating an example of each set of the setting values after the graphic description information indicated by the symbol X10 is input. When a tile location of the graphic "TRIANGLE_2" is input, since the graphic numbers of the TILE_0 and the TILE_1 are greater than the graphic numbers of the setting value retaining part 125, it is determined that there is no updated setting parameter. Thus, the graphic index (8 bytes) alone is counted. Since the TILE_2 is a first graphic, the tile start instruction, the total size of the setting values, and the total 40 bytes of the graphic indexes are stored (the aggregation process ends until the symbol X10).

[5] Process in a Case in which the Graphic is Input After the Update of the Setting Values.

FIG. 16 is a diagram illustrating an example of each of the setting values after the graphic description information indicated by the symbol X13 is input. After a SETTING_C_1 is input, a graphic "TRIANGLE_3" is input. Since the graphic number of the SETTING_C is the same as the graphic number of the TILE_2, it is determined to update the SETTING_C. Accordingly, total 16 bytes of the SETTING_C (8 bytes) and the graphic index (8 bytes) are added to the count value of the TITLE_2 (the aggregation process ends until the symbol X13).

[6] At an End of a Scene Count.

FIG. 17 is a diagram illustrating an example of each of the setting values when a scene count ends. As illustrated in FIG. 17, the aggregation process ends for each of the tiles. In the example illustrated in FIG. 17, the data size of "0x30" is estimated for the TILE_0. The data size of "0x38" is estimated for the TILE_2.

<<Address Determination Process>>

Based on the above described estimation result, the address determination part 115 determines the beginning address of the storage area in the memory 102 used to store the scene data corresponding to each of the tiles.

Figure 18:
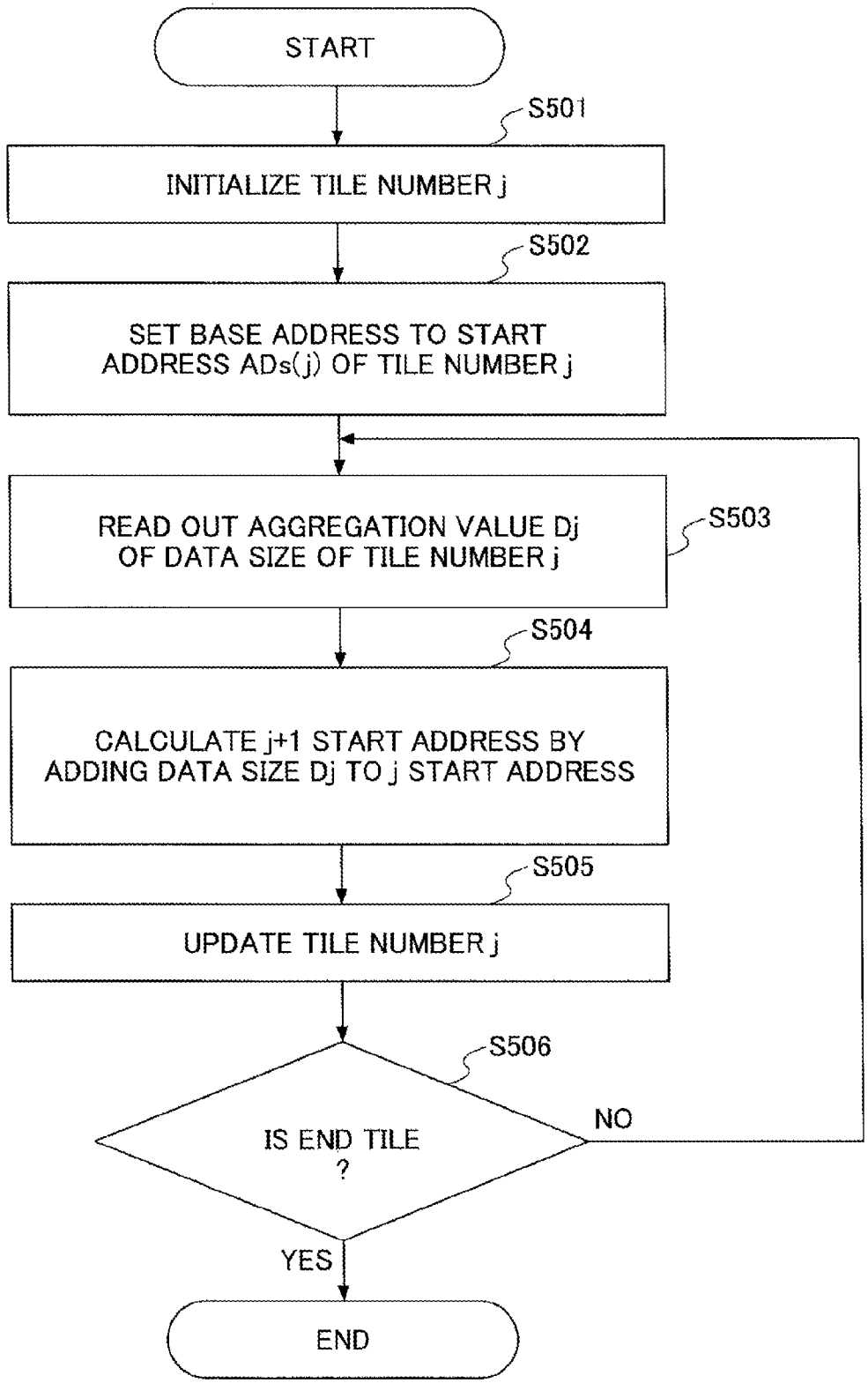
FIG. 18 is a flowchart for explaining an example of an address determination process.

FIG. 18 is a flowchart for explaining an example of the address determination process. In the example illustrated in FIG. 18, the beginning address of the storage area corresponding to each of the tiles is determined in order to successively store the scene data for each of the tiles in the storage area in the memory 102 in which a predetermined base address is set as the beginning address.

In step S501, the address determination part 115 initializes a tile number j. In step S502, the address determination part 115 sets the above described base address to a beginning address Ads(j).

In step S503, the address determination part 115 reads out an aggregation value $D_j$ of the data size retained in the count value retaining part 128 corresponding to the tile number j.

In step S504, the address determination part 115 adds the aggregation value $D_j$ read from the count value retaining part 128 to the beginning address Ads(j) of the tile number j, and calculates a beginning address Ads(j+1) of a tile number j+1.

In step S505, the address determination part 115 updates the tile number j.

In step S506, the address determination part 115 determines whether the tile indicated by the tile number j is an end tile. If the tile is the end tile (YES in step S506), the address determination part 115 terminates the address determination process. If the tile is not the end tile (NO in step S506), the address determination part 115 returns to step S503, and conducts a calculation process of the beginning address corresponding to the tile indicated by an updated tile number j.

The address determination part 115 calculates the beginning address of the scene data for each of the tiles based on a size count value (the aggregation value) in the tile buffer 129 acquired in the scene count process. In a calculation method, the count value of the TILE_0 is read out, and the count value is temporarily saved in a register. Then, zero is written into a size count of a next TILE_0.

The address determination part 115 reads out the size count value of the TILE_1 which indicates a scene data size of a next tile, temporarily saves the size count value, and writes the size count value of the TILE_0 in the TILE_1. Furthermore, the address determination part 115 reads out the size count value of the TILE_2, temporarily saves the size count value, and writes the size count value of the TILE_0 and the TILE_1 in the TILE_2. After that, the address determination part 115 writes a total value of the size count values of the TILE_0 through the TILE_2 in the TILE_3.

FIG. 19 is a diagram illustrating an example of a tile buffer as a result of the address determination process. In the example illustrated in FIG. 19, the size count value for each of the tiles is explained.

A value of the TILE_0 is substituted into the TILE_1

→0x30.

A total value of the TILE_0 and the TILE_1 is substituted into the TILE_2

→0x30+0x30=0x60.

A total value of the TILE_0, the TILE_1, and the TILE_2 is substituted into the TILE_3

→0x30+0x30+0x38=0x98.

As described above, after the address determination process, a value of the tile buffer 129 indicates the beginning address to write data for each of tiles. It is assumed that the base address indicates "0x20000_0000". The base address indicates the beginning address of a write destination area.

Next, as described above, based on the beginning address determined for each of the tiles, a write process, which writes the graphic description information specified for each of the tiles by the determination part 112 into the memory 102, will be described. The write process is controlled not to cause the overflow in the memory 102, and writes the graphic description information into the memory 102.

Figure 21A:
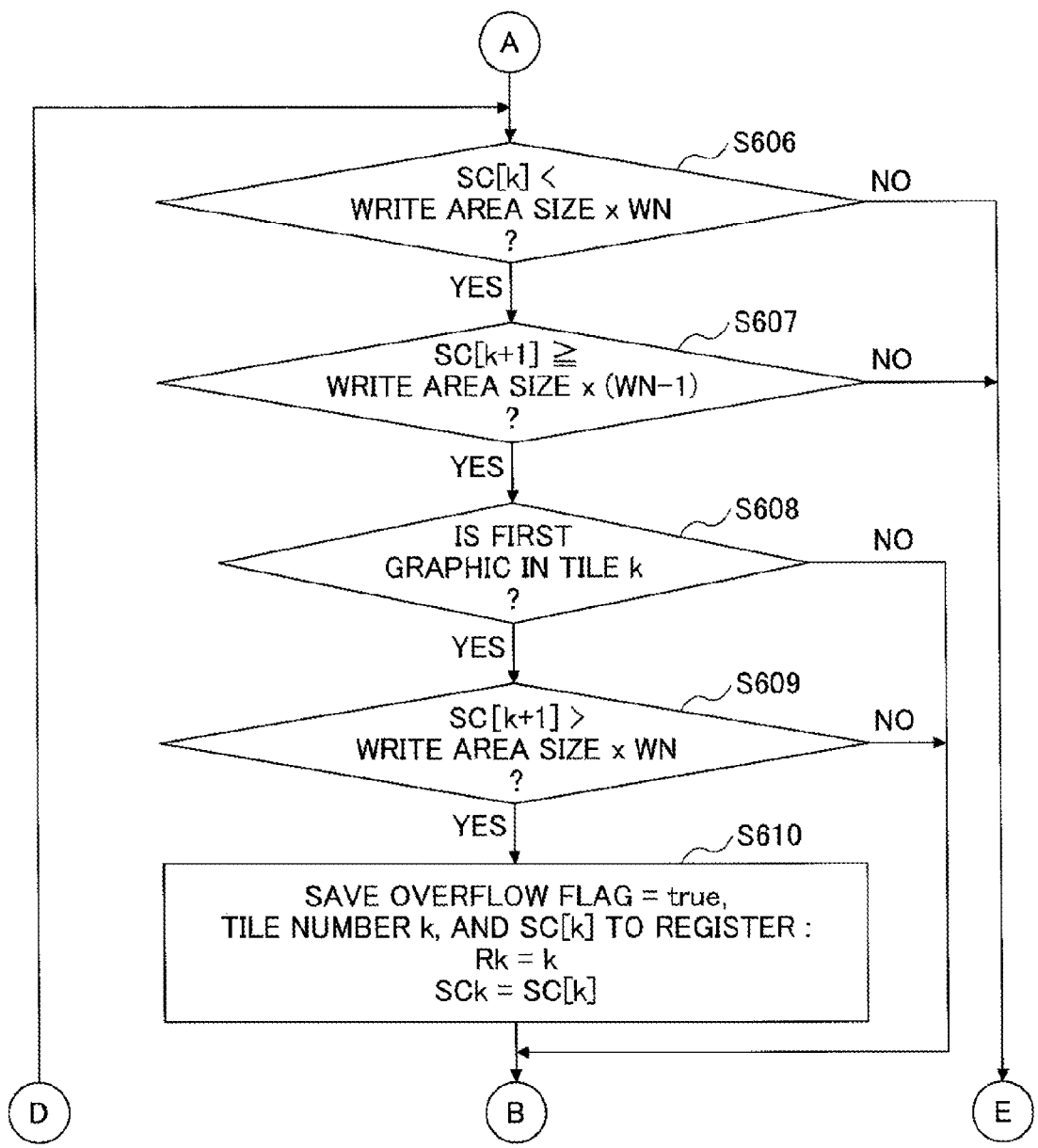

FIG. 20, FIG. 21A, and FIG. 21B are flowcharts for explaining the example of the write process. The write process illustrated in FIG. 20, FIG. 21A, and FIG. 21B is conducted after sorting of the scene data is conducted for each of the tiles.

In step S601, the overflow determination part 117 sets one to a write number WN for writing to the tile buffer 129. The write number WN indicates a number for writing in the memory 102 until the write process is stopped. The write number WN indicates 1 until a first writing stop. The write number WN indicates 2 until a second writing stop.

In step S602, the overflow determination part 117 sets a value "false" to an overflow flag. In step S603, the determination part 112 clears the setting value retaining part 125.

In step S604, the determination part 112 determines whether the graphic description information read by the read part 111 indicates the setting value of the setting parameter or the graphic index. When the graphic description information indicates the setting value, the determination part 112 advances to step S605. When the graphic description information indicates the graphic index, the determination part 112 advances to step S606 (FIG. 21A).

In step S605, the determination part 112 determines for which setting parameter the setting value is, and retains the setting value and a current graphic number in the setting value retaining part 125.

In step S606, the overflow determination part 117 sets the tile number of the tile to which the graphic index is drawn to a variable k, and determines whether a condition of "an aggregation value SC[k] of a tile k<the write destination area size×WN" is satisfied. The aggregation value SC[k] represents the aggregation value of the tile k of the tile buffer 129. The write destination area size indicates a size of an area which is allotted for the scene data 106 of the tile units in the memory 102.

If this condition is satisfied (YES in step S606), the overflow determination part 117 advances to step S607. If this condition is not satisfied (NO in step S606), the overflow determination part 117 stops the write process, and advances to step S620 (FIG. 21B).

In step S607, the overflow determination part 117 determines whether a condition of "SC[k+1]≥the write destination area size×(WN−1)" is satisfied. When this condition is satisfied (YES in step S607), the overflow determination part 117 advances to step S608. When this condition is not satisfied (NO in step S607), the overflow determination part 117 advances to step S620 (FIG. 21B).

In step S608, the overflow determination part 117 determines whether the graphic is the first graphic for the tile k. When the graphic is the first graphic (YES in step S608), the overflow determination part 117 advances to step S609. When the graphic is not the first graphic (NO in step S608), the overflow determination part 117 advances to step S611 (FIG. 21B).

In step S609, the overflow determination part 117 determines whether a condition of "SC[k+1]>the write beginning area size×WN" is satisfied. When this condition is satisfied (YES in step S609), the overflow determination part 117 advances to step S610. When this condition is not satisfied (NO in step S609), the overflow determination part 117 advances to step S611 (FIG. 21B).

In step S610, the overflow determination part 117 sets a value "true" to the overflow flag, and instructs the save/restore part 118 to save the initial value. The save/restore part 118 saves the number k of the tile and SC[k] in the initial value retaining part 119 in response to the instruction of overflow determination part 117.

In step S611, the memory write part 116 determines whether the tile k is a first appearing tile. When the tile k is the first appeared tile (YES in step S611), the memory write part 116 advances to step S612. When the tile k is not the first appearing tile (NO in step S611), the memory write part 116 advances to step S613.

In step S612, the memory write part 116 writes start information of the tile k into the memory 102. The start information of the tile may be information of the tile start instruction.

In step S613, the memory write part 116 determines whether a condition of "the graphic number NPi of a predetermined setting parameter of the setting value retaining part 125≥the graphic number NT of the tile k of the tile buffer 129" is satisfied. When the condition of "NPi≥NT" is satisfied (YES in step S613), the memory write part 116 advances to step S614. When the condition of "NPi≥NT" is not satisfied (NO in step S613), the memory write part 116 advances to step S615.

In step S614, the memory write part 116 writes the setting value of the setting parameter into the memory 102. In this case, a write address is set as follows:

$$\text{address } (WriteAddress) = \\ SC[k] - \text{write destination area size} \times (WN - 1) + \text{base address} \quad (1)$$

The base address indicates the first address of the area of the scene data 106 of the tile units in the memory 102.

In step S615, the aggregation part 114 adds the data length Lpv as the size for each of the setting values to SC[k] of a respective tile k.

In step S616, the determination part 112 determines whether all setting parameters are processed. When the write process ends for all setting parameters (YES in step S616), the determination part 112 advances to step S617. When the write process does not end for all setting parameters (NO in step S616), the determination part 112 returns to step S613, and conducts the above described write process for another setting parameter.

In step S617, the memory write part 116 writes the graphic index into the memory 102. In this case, the write address is regarded as an address calculated in the above expression (1).

In step S618, the aggregation part 114 adds the data length Lin as the size of the graphic index to SC[k] of the tile k. In a case of writing the scene data, a value of the tile buffer 129 indicates the write address of the graphic description information for which the writing of the tile ends. Accordingly, the aggregation part 114 updates a value of the tile buffer 129 in step S615 or step S618.

In step S619, the determination part 112 updates the graphic number of the tile k retained in the graphic number retaining part 123 by a latest value.

In step S620, the determination part 112 determines whether all tiles in which the graphics are drawn are processed. When all tiles are processed (YES in step S620), the determination part 112 advances to step S621 (FIG. 20). When all tiles are not processed (NO in step S620), the determination part 112 returns to step S606 (FIG. 21), and repeats the above described process for another tile k. The tile number k may be incremented by one to process another tile k.

In step S621 (FIG. 20), the determination part 112 determines whether all sets of the scene data are processed. When all sets of the scene data are processed (YES in step S621), the determination part 112 advances to step S622. When all sets of the scene data are not processed (NO in step S621), the determination part 112 returns to step S603 and repeats the same process for another set of the scene data.

In step S622, the overflow determination part 117 determines whether the overflag indicates a value "true". When the overflow flag indicates a value "true" (YES in step S622), and the overflow determination part 117 advances to step S623. When the overflow flag does not indicate the value "true" (NO in step S622), the overflow determination part 117 determines an end of writing all sets of the scene data after the scene data are sorted and terminates the write process.

In step S623, the overflow determination part 117 instructs the save/restore part 118 to restore the initial value. When the save/restore part 118 receives this instruction, the save/restore part 118 initializes the aggregation value of a tile number Rk of the tile buffer 129 by SCk. Also, the overflow determination part 117 adds one to the write number WN. When a process in the step S623 ends, the overflow determination part 117 returns to step S602. The write process is resumed when an the area becomes free in the memory 102.

<<Example of Write Process>>

Figure 22B:
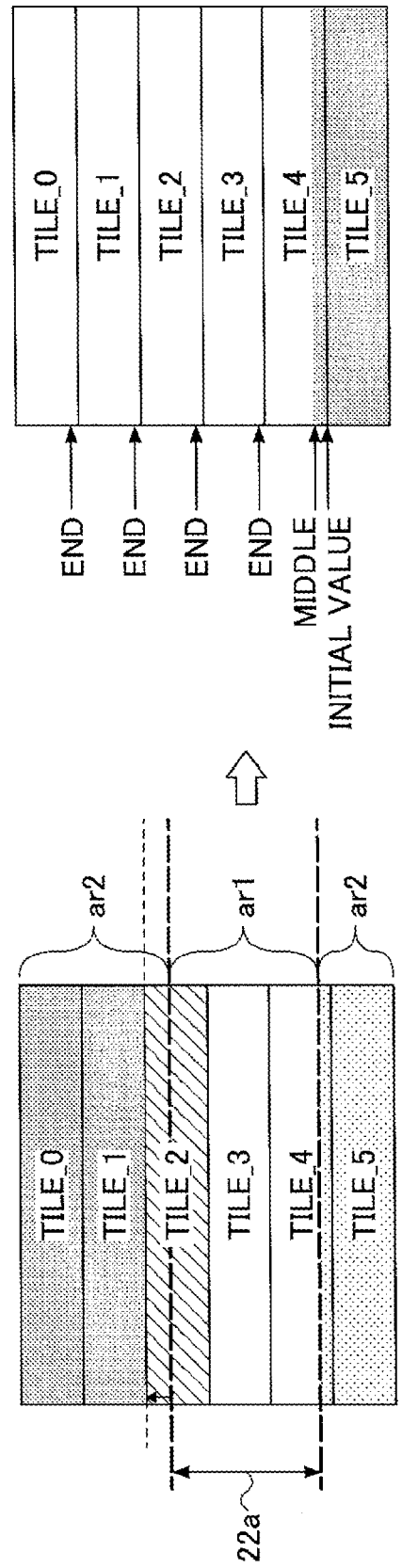
Figure 22C:
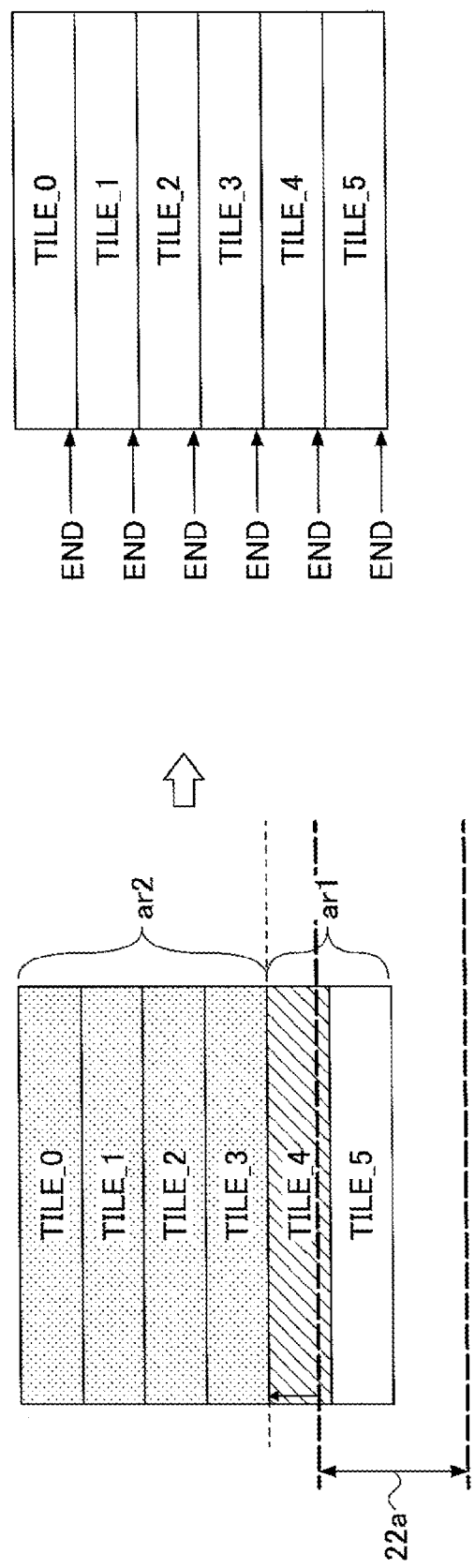

Next, an example of the write process will be described. First, the write process will be briefly described. FIG. 22A through FIG. 22C are diagrams for briefly explaining the write process. In FIG. 22A through FIG. 22C, the tile in which the overflow occurs is determined, and a value of the tile being an overflow occurrence target is restored to be an original value (initial value).

In a first write process of the tile buffer 129 illustrated in FIG. 22A, the scene data may be written into the memory 102 in middle of the TILE_2. After the middle of the TILE_2, the scene data is not written into the memory 102. The tile buffer 129 is not updated.

In FIG. 22A, an area ar1 is regularly updated. An area ar2 may correspond to an area in which the update of the tile buffer 129 is not conducted. An area 22a in FIG. 22A represents the storage area of the scene data 106 of the tile units to write the scene data therein.

After the first tile buffer write process ends, the aggregation value of the tile buffers 129 after the TILE_3 remains to be the initial value.

In a second tile buffer write process in FIG. 22B, when the memory 102 has free space, the scene data may be written into the memory 102 until a middle of a TILE_4 from the middle of the TILE_2. In this case, the aggregation value of the tile buffer 129 and the graphic number of the TILE_2 are back to be the initial values.

After the second tile buffer write process ends, the aggregation value of the tile buffer 129 of the TILE_5 remains to be the initial value.

In a third tile buffer write process illustrated in FIG. 22C, when the memory 102 has the free area, the scene data may be written into the memory 102 in the middle of the TILE_4. In this case, the aggregation value of the tile buffer 129 and the graphic number of the TILE_4 may be back to the initial values.

After the third tile buffer write process ends, values of tile buffers 129 for all tiles are updated.

Next, the update for each of the setting values and the update of the memory 102 in the write process will be described based on the example illustrated in FIG. 2. For ease of explanation, each of sets of data illustrated in FIG. 2 is eight bytes of data.

[1] Write process of TRIANGLE_1.

FIG. 23 is a diagram illustrating an example of each of the setting values when the write process of the TRIANGLE_1 ends. In the following, the write destination area size of the memory 102 is 0x80, and the base address is 0x0780_0000.

A current write process is the first tile buffer write process. The scene data after the sort process are written from an address indicated by a WriteAddress=0x0780_0000.

In the TILE_0 and the TILE_1, since the TRIANGLE_1 is a first graphic, the overflow determination is conducted. It is determined that the overflow does not occur.

[2] Write Process of TRIANGLE_2.

Next, the write process of the TRIANGLE_2 is conducted. In the TILE_2, since the TRIANGLE_2 is the first graphic, the overflow is determined. Before the tile buffer 129 of the TILE_2 is updated for a first time, the overflow determination part 117 refers to the value (SC[3]) of the tile buffer 129 of a next tile (TILE_3).

The overflow determination part 117 determines that the overflow may occur in the write destination area when the value of SC[3] satisfies a condition below.

$$SC[k+1] > \text{write destination area size} \times WN$$

SC[k+1]: aggregation value of the tile buffer 129 of the next tile
WN: tile buffer writing number FIG. 24 is a diagram illustrating an example for each of the setting values when the write process of the TRIANGLE_2 is conducted. As illustrated in FIG. 24, in the TILE_2, since the aggregation value "0x0000_0098" of the TILE_3 is greater than 0x80x1 (0x0000_0098>0x80x1), it is determined that the overflow occurs.

When it is determined that the overflow occurs, a location (information called "TILE_2") where the overflow occurs, and the initial value (SC[2]=0x0000_0060) of the tile buffer 129 for the tile of the location are saved in the initial value save register 119r. The initial value save register 119r may be the initial value retaining part 119. The graphic number retaining part 123 retains a latest graphic index [2].

[3] Case of Overflow.

When the write process is conducted for the TRIANGLE_2, the overflow determination part 117 determines whether an address after the tile buffer 129 is updated is within the write destination area. The area of the scene data 106 of the tile units in the memory 102 satisfies a condition of "0x00≤area<0x80", and the address of the TRIANGLE_2 of the TILE_2 is 0x80. Accordingly, it is not allowed to write information of the TRIANGLE_2 of the TILE_2 in the memory 102.

FIG. 25 is a diagram illustrating an example of each of the setting values when the overflow occurs. As illustrated in FIG. 25, the scene data are written in the entire area prepared beforehand in the memory 102. Also, as illustrated in FIG. 25, when data are not written in the area, the value of the tile buffer 129 is not updated. As a result, the aggregation value of the TILE_2 in the tile buffer 129 becomes 0x78, and counting of the aggregation value is stopped.

[4] Update of Setting Value after Overflow.

The sort part 110 reads out the scene data after the TRIANGLE_2, and executes the write process. However, since there is no free area in the memory 102, the write process is not conducted with respect to the memory 102 and the update of the tile buffer 129 is not conducted.

FIG. 26 is a diagram illustrating an example of each of the settings after the overflow occurs. In the example illustrated in FIG. 26, states of the setting value retaining part 125 and the tile buffer 129 after the first scene data 106 are read out. As illustrated in FIG. 26, the aggregation value of the tile buffer 129 is not updated from when the overflow occurs.

[5] When Second Write Process is Started.

When the first write process ends, the value of the TILE_2 of the tile buffer 129 is set back to the initial value by using a value stored in the initial value save register 119r.

Figure 27:
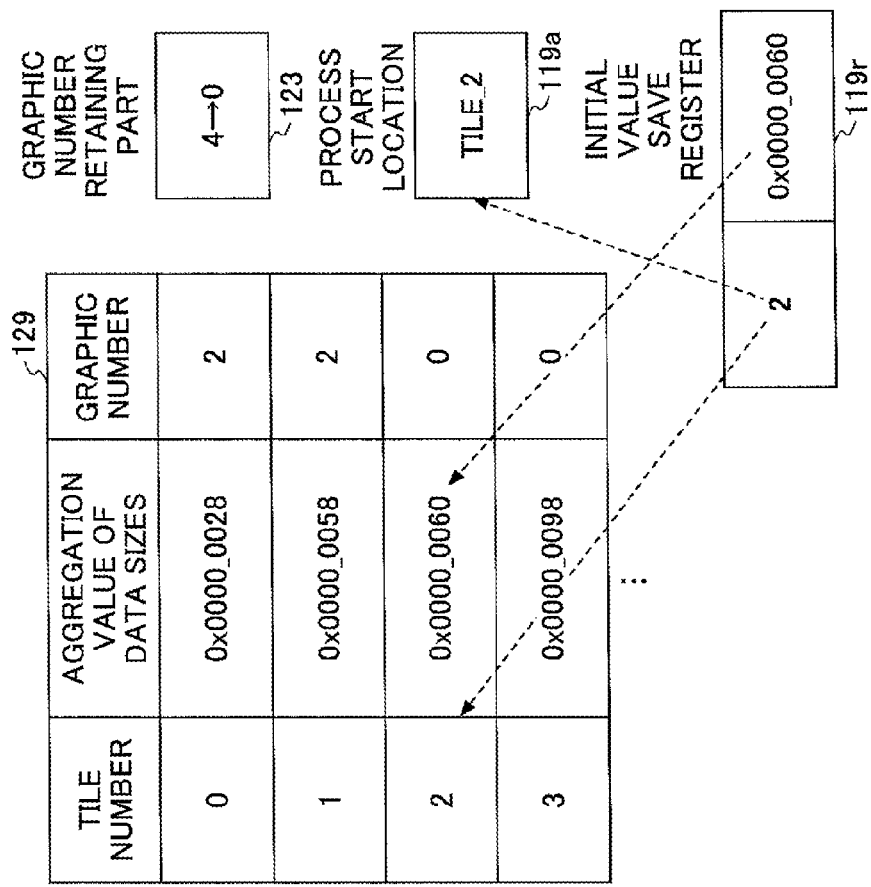
FIG. 27 is a diagram illustrating an example of each of the setting values when a second write process starts.

FIG. 27 is a diagram illustrating an example of each of the setting values when the second write process starts. As illustrated in FIG. 27, by storing a start location in the second write process in the initial value retaining part 119, it is possible to omit processes of the TILE_0 and the TILE_1 in which the writing has been already completed. The initial value retaining part 119 includes the register 119r which stores a process start location.

[6] Second Write Process Execution.

Next, a second sort process and the second write process are executed. Similar to the first time, the sort part 110 reads out from a beginning of the scene data 106. In a case in which the second sort process is conducted, even if a condition of "0x80≤aggregation value in tile buffer 129<0x100" is satisfied, the sort part 110 conducts the writing of the scene data after the sort process. An address to write the scene data is acquired by the expression (1).

In the example in FIG. 27, the storage area of the scene data 106 of the tile units includes two storage areas. An example of writing the scene data after the sort process will be sequentially described by using the two storage areas. One storage area or more than three storage areas may be used. It is assumed that the base address of the storage area used in the second write process is 0x0800_0000. Also, in a case of one storage area of the scene data 106 of the tile units, the base address is 0x0780_0000.

In the sort part 110, when a condition of "0x80≤the aggregation value in the tile buffer<0x100" is satisfied, the scene data are written. Accordingly, the scene data are written when the value of WriteAddress is within a range which is greater than or equal to 0x0800_0000 and smaller than 0x0800_0080 (0x0800_0000≤WriteAddress<0x0800_0080).

The sort part 110 inputs and writes the TRIANGLE_2 into the memory 102 in the second write process. In this case, the setting value retaining part 125 and each of the setting values of the tile buffers 129 are illustrated in FIG. 28.

Figure 28:
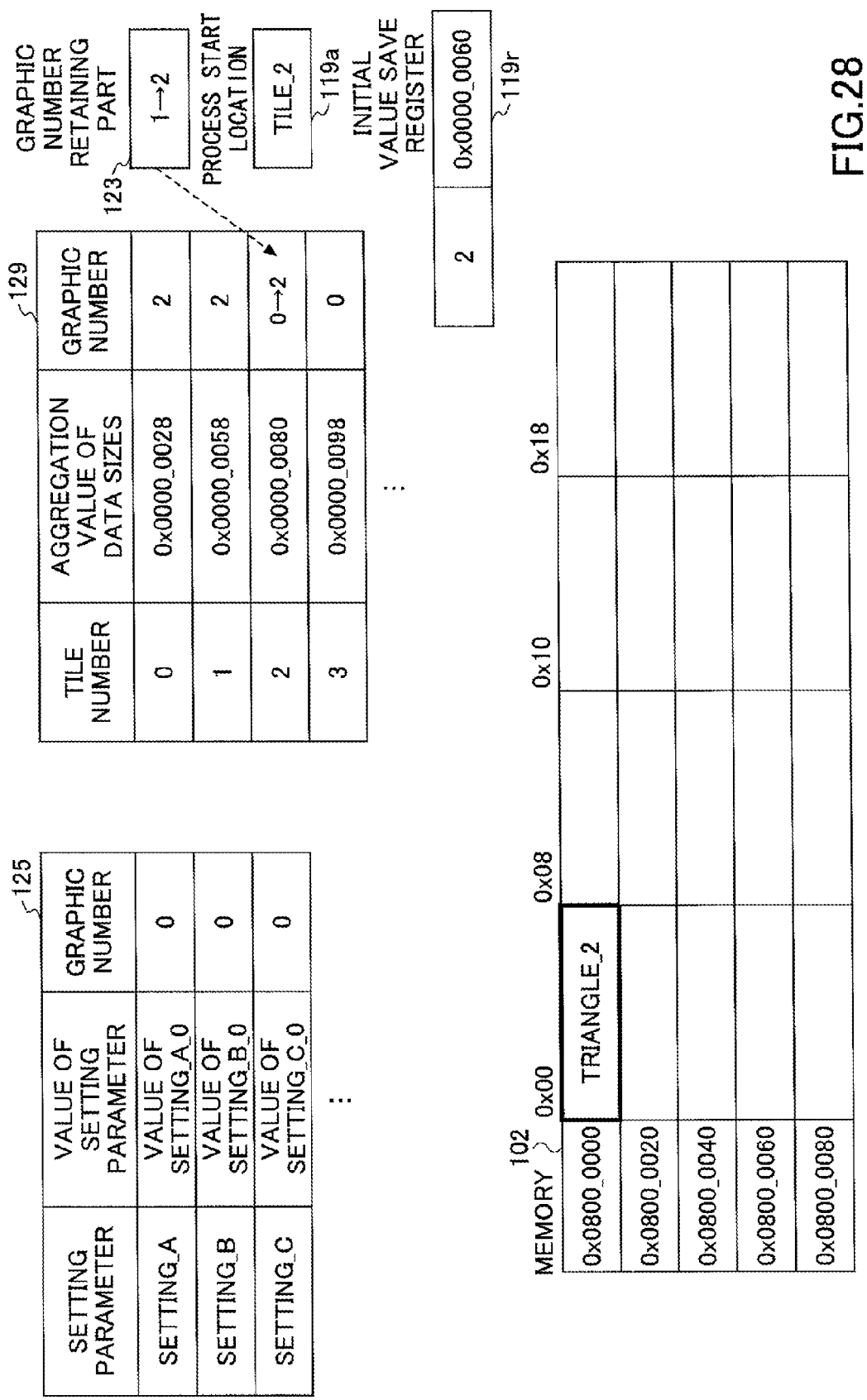
FIG. 28 is a diagram illustrating an example of each of the setting values when the TRIANGLE_2 of a TILE_2 is written.

FIG. 28 is a diagram illustrating an example of each of the setting values when the TRIANGLE_2 of the TILE_2 is written. As illustrated in FIG. 28, the aggregation value of the TILE_2 of the tile buffer 129 updates to be "0x0000_0080", and the graphic number is updated to indicate "2". Also, the graphic description information of the TRIANGLE_2 is stored at the address of "0x0800_0000" in the memory 102. The TILE_0 and the TILE_1 prior to the process start location are not updated.

[7] When Second Write Process Ends.

After that, the sort part 110 reads out data until an end of the scene data 106 while conducting the overflow determination. In this case, an occurrence of the second overflow is not determined, and the entire scene data after the sort process are written in the memory 102.

Figure 29:
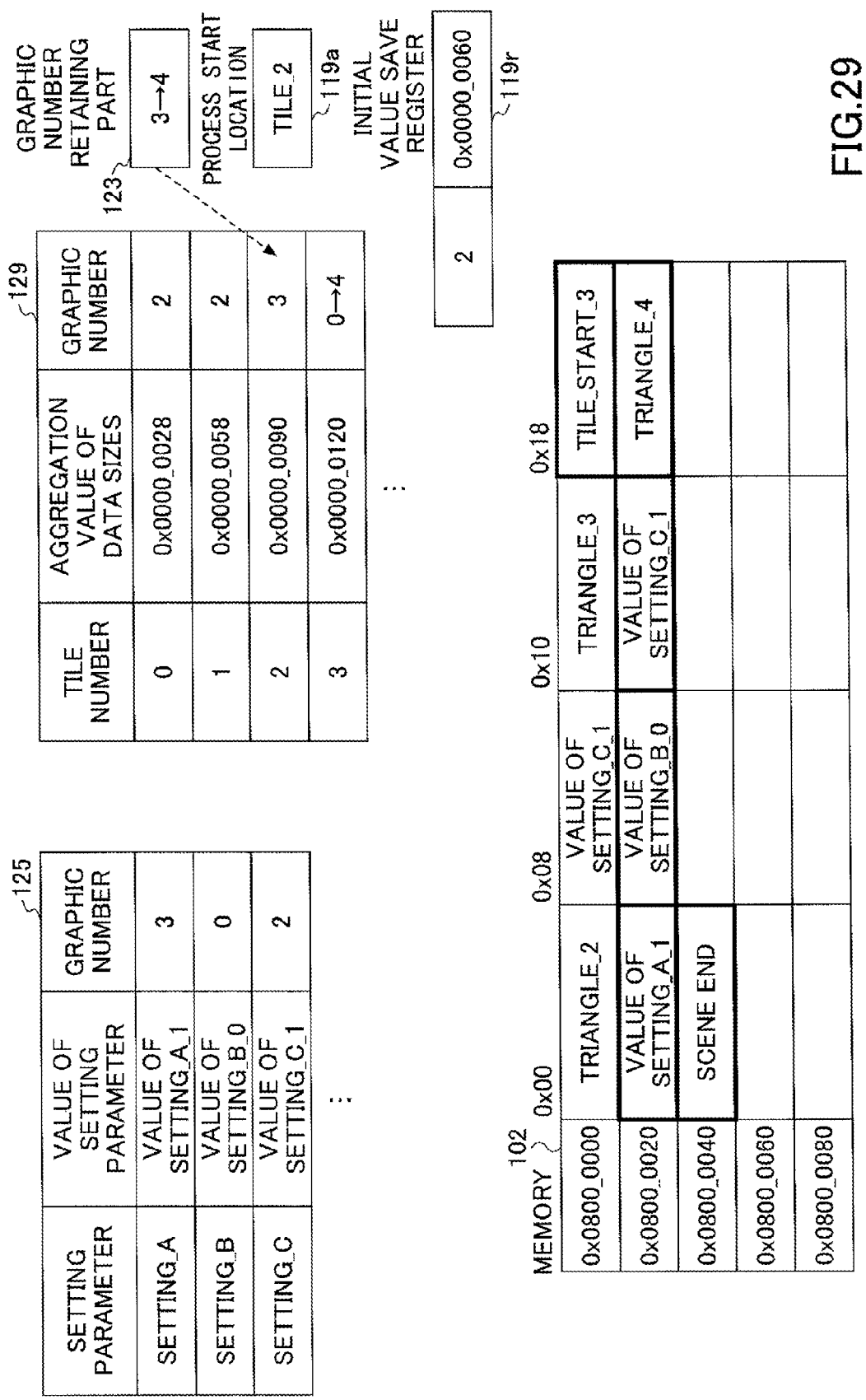
FIG. 29 is a diagram illustrating an example of each of the setting values when the second write process ends.

FIG. 29 is a diagram illustrating an example of each of the setting values when the second write process ends. In the example illustrated in FIG. 29, final values of the setting value retaining part 125 and values of the tile buffer 129 are illustrated. Also, in FIG. 29, a second storage area in the memory 102 is illustrated.

As described above, according to the embodiment, it is possible to store the scene data of the tile units corresponding to each of the tiles so as to effectively access the memory 102. According to the embodiment, it is possible to create the scene data of the tile units by executing the sort process multiple times and to effectively conduct the overflow determination. Thus, it is possible to reduce a memory size.

Figure 30:
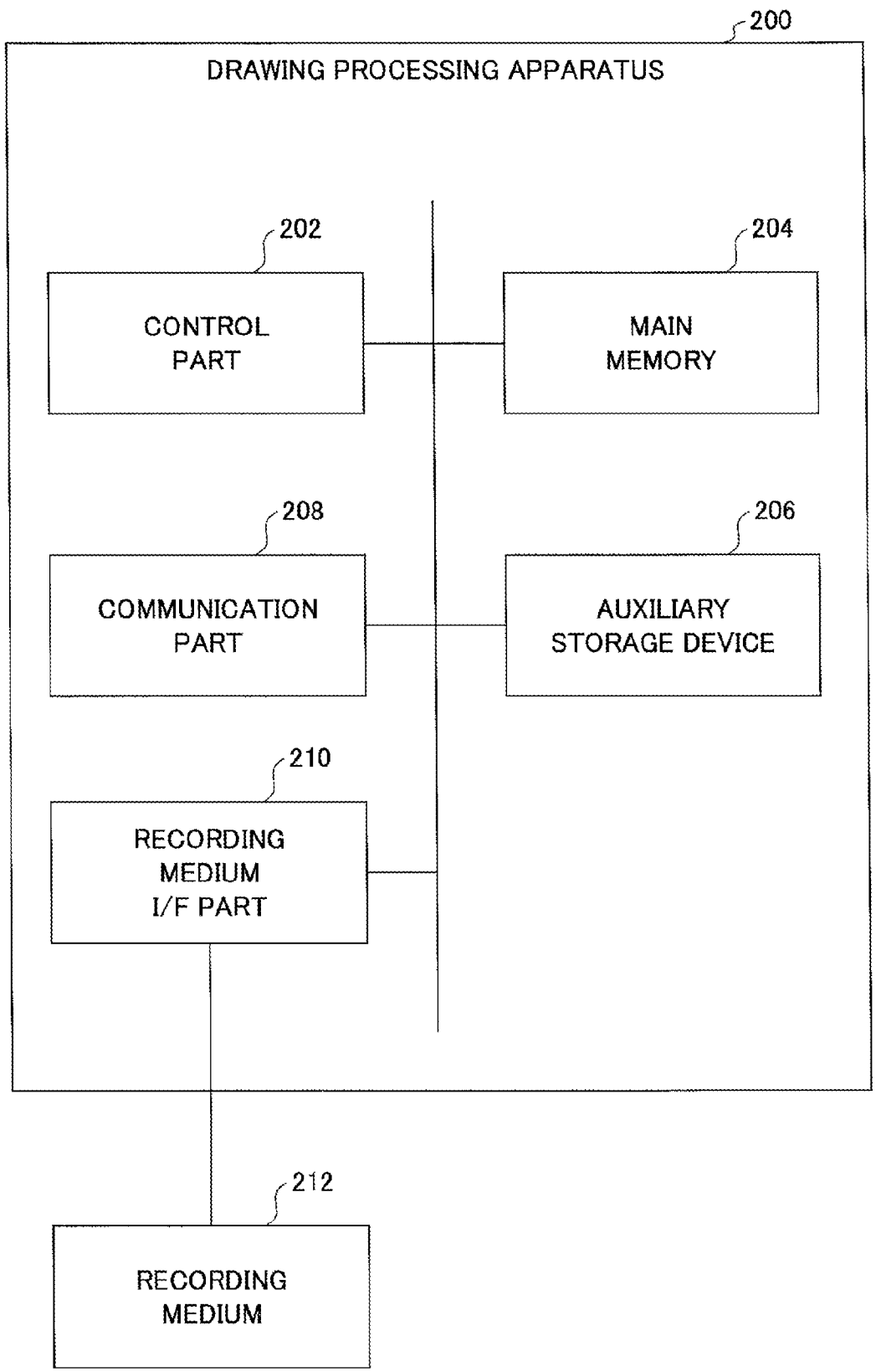
FIG. 30 is a block diagram illustrating an example of a hardware configuration of the drawing processing apparatus in the embodiment.

FIG. 30 is a block diagram illustrating an example of a hardware configuration of the drawing processing apparatus in the embodiment. The drawing processing apparatus 200 includes a control part 202, a main memory 204, an auxiliary storage device 206, a communication part 208, and a recording medium I/F part 210, which are mutually connected through a bus to be capable of sending and receiving data.

The control part 202 is a processor such as a CPU (Central Processing Unit) in a computer apparatus to control each device, and to calculate and process data. Also, the control part 202 corresponds to a calculation apparatus which executes a program stored in the auxiliary storage device 206. The control part 202 receives data from the communication part 208, the main memory 204, the auxiliary storage device 206, and the like, calculates and processes the data, and outputs the data to an output part, the main memory 204, and the auxiliary storage device 206.

Also, the control part 202 realizes the above described sort function by executing a sort program which may be stored in the auxiliary storage part 206. Moreover, the control part 202 may include a sort process circuit which functions as the above described sort part 110 to conduct the sort process. The sort process circuit may be one or more integrated circuits, and may be an ASIC (Application Specification Integrated Circuit).

The main memory 204 includes a ROM (Read-Only Memory) and a RAM (Random Access Memory), and may be a storage device to store or temporarily save programs such as an OS (Operating System) being a basic software, application software, and the like which the control part 202 executes, and data used in processes by the control part 202. The main memory 204 may be the memory 102 described above.

The auxiliary storage device 206 may be a HDD (Hard Disk Drive) or the like to store data pertinent to the application software. Also, the auxiliary storage device 206 may store a sort process program acquired from a recording medium 212, the scene data, and the like. The recording medium 212 may be formed by a non-transitory (or tangible) computer-readable recording medium.

The communication part 208 conducts communications through a network which may be a wired or wireless network. The recording medium I/F part 210 may be an interface between the recording medium 212 (such as a flash memory or the like) which is connected through a data transmission channel such as a USB (Universal Serial Bus) and the drawing processing apparatus 200.

Also, a predetermined program is stored to the recording medium 212. The predetermined program stored in the recording medium 212 is installed into the drawing processing apparatus 200 through the recording medium I/F part 210. The predetermined program being installed becomes executable by the drawing processing apparatus 200.

Also, the drawing processing apparatus 200 includes a configuration of a general-purpose computer in addition to the above described configuration. The drawing processing apparatus 200 may include an input part and a display part.

Moreover, the drawing processing apparatus in the embodiment may be applied to a Personal Computer (PC), a portable terminal such as a smart phone, a tablet PC, and an information processing apparatus implemented in a car navigation system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A drawing processing apparatus comprising:
a determination part configured to specify either one of a graphic index of a graphic included in a display screen and graphic description information which includes a setting parameter to be applied to the graphic, for each of regions dividing the display screen;
an aggregation part configured to aggregate a data size of the graphic description information specified by the determination part for the regions;
an address determination part configured to determine a start address in a memory into which the graphic description information of the regions is written, so as to store the graphic description information of the regions into a successive storage area in the memory, based on the data size aggregated by the aggregation part;
an overflow determination part configured to determine whether an overflow occurs in the memory;
an initial value storage part configured to store a data size of an area of an overflow occurrence target when the overflow determination part determines that the overflow occurs; and
a write part configured to write the graphic description information of the regions successively from the start address determined by the address determination part in a case in which the overflow determination part determines that the overflow does not occur, and to stop writing the graphic description information and resume a write process from the area of the overflow occurrence target by using the data size stored in the initial value storage part when the memory has a free space, in a case in which the overflow determination part determines that the overflow occurs.

2. The information processing apparatus as claimed in claim 1, wherein the determination part conducts a determination process again by using previous graphic description information when the write part resumes the write process.

3. The information processing apparatus as claimed in claim 1, wherein the memory includes multiple memory areas; and
the write part successively writes the graphic description information into the multiple memory areas.

4. The drawing processing apparatus as claimed in claim 1, wherein the write part acquires a write address by a calculation:

a data size of a write target area−a size of the memory×((a write number until the write process is stopped)−1)+a beginning address of the memory.

5. A drawing process method performed in a computer, the method comprising:

specifying either one of a graphic index of a graphic included in a display screen and graphic description information which includes a setting parameter to be applied to the graphic, for each of regions dividing the display screen;

aggregating a data size of the graphic description information specified in the specifying, for the regions;

determining a start address in a memory into which the graphic description information of the regions is written, so as to store the graphic description information of the regions into a successive storage area in the memory, based on the data size aggregated by the aggregating the data size;

determining whether an overflow occurs in the memory;

storing a data size of an area of an overflow occurrence target when the determining determines that the overflow occurs;

writing the graphic description information of the regions successively from the start address determined in the determining the start address in a case in which the determining determines that the overflow does not occur; and stopping writing the graphic description information and resuming a write process from the area of the overflow occurrence target by using the data size stored in the initial value storage part when the memory has a free space, in a case in which the determining determines that the overflow occurs.

\* \* \* \* \*